(12) United States Patent
Luick

(10) Patent No.: US 8,301,871 B2
(45) Date of Patent: Oct. 30, 2012

(54) PREDICATED ISSUE FOR CONDITIONAL BRANCH INSTRUCTIONS

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 11/422,901

(22) Filed: Jun. 8, 2006

(65) Prior Publication Data

US 2007/0288730 A1    Dec. 13, 2007

(51) Int. Cl.
*G06F 7/38* (2006.01)
*G06F 9/00* (2006.01)
*G06F 9/44* (2006.01)
*G06F 15/00* (2006.01)

(52) U.S. Cl. ........................................ 712/239

(58) Field of Classification Search .................. 712/234, 712/238
See application file for complete search history.

(56) References Cited

U.S. PATENT DOCUMENTS

| | | | |
|---|---|---|---|
| 4,435,756 A | 3/1984 | Potash | |
| 5,608,886 A | 3/1997 | Blomgren et al. | |
| 5,838,962 A | 11/1998 | Larson | |
| 5,949,995 A | 9/1999 | Freeman | |
| 6,115,809 A | 9/2000 | Mattson, Jr. et al. | |
| 6,272,623 B1 | 8/2001 | Talcott | |
| 6,353,882 B1 | 3/2002 | Hunt | |
| 6,374,349 B1 * | 4/2002 | McFarling | 712/239 |
| 6,502,188 B1 | 12/2002 | Zuraski, Jr. et al. | |
| 6,510,511 B2 | 1/2003 | Talcott | |
| 6,697,932 B1 * | 2/2004 | Yoaz et al. | 712/216 |
| 6,823,446 B1 * | 11/2004 | Sinharoy | 712/239 |
| 7,069,426 B1 | 6/2006 | Hummel | |
| 7,404,070 B1 | 7/2008 | Patil et al. | |
| 2001/0047467 A1 | 11/2001 | Yeh et al. | |
| 2002/0029333 A1 | 3/2002 | Talcott | |
| 2002/0073301 A1 | 6/2002 | Kahle et al. | |
| 2005/0066154 A1 | 3/2005 | Chung | |
| 2005/0216714 A1 | 9/2005 | Grochowski | |
| 2007/0288731 A1 | 12/2007 | Bradford et al. | |
| 2007/0288732 A1 | 12/2007 | Luick | |
| 2007/0288733 A1 | 12/2007 | Luick | |
| 2007/0288734 A1 | 12/2007 | Luick | |
| 2007/0288736 A1 | 12/2007 | Luick | |

OTHER PUBLICATIONS

Klauser et al.; Dynamic Hammock Predication for Non-predicated Instruction Set Architectures; 1998; International Conference on Parallel Architectures and Compilation Techniques 1998.*
Santos et al.; Complex Branch Profiling for Dynamic Conditional Execution; 2003; SBAC-PAD '03.*
Klauser et al; Selective Eager Execution on the PolyPath Architecture; 1998; ISCA '98.*
Tyson; The Effects of Predicated Execution on Branch Prediction; 1994; International Symposium on Microarchitecture '94.*

(Continued)

*Primary Examiner* — Corey S Faherty
(74) *Attorney, Agent, or Firm* — Patterson & Sheridan, LLP

(57) ABSTRACT

A method and apparatus for executing branch instructions is provided. In one embodiment, the method includes receiving a branch instruction, wherein a first path of the branch instruction branches to a target instruction, and wherein a second path of the branch instruction branches to one or more interceding instructions between the branch instruction and the target instruction. The method further includes issuing the one or more interceding instructions and the target instruction and determining if the branch instruction follows the first path or the second path. Upon determining that the branch instruction follows the first path, the one or more interceding instructions between the branch instruction and the target instruction are invalidated.

8 Claims, 18 Drawing Sheets

OTHER PUBLICATIONS

Smith et al.; Complexity-Effective Superscalar Processors; 1997; ISCA '97.*

Aragon, Juan L. et al., Power-Aware Control Speculation through Selective Throttling, Proceedings of the 9th International Symposium on High-Performance Computer Architecture, 2003, IEEE Computer Society, Washington, D.C., United States.

Chang, Po-Yung et al., Branch classification: a new mechanism for improving branch predictor performance, Proceedings of the 27th Annual International Symposium on Microarchitecture, 1994, pp. 22-31, ACM, NY, NY, United States.

Chang, Po-Yung et al., Alternative Implementations of Hybrid Branch Predictors, Proceedings of the 28th Annual International Symposium on Microarchitecture, 1995, pp. 252-257, IEEE Computer Society, Los Alamitos, CA, United States.

Evers, Marius et al., Using Hybrid Branch Predictors to Improve Branch Prediction Accuracy in the Presence of Context Switches, Proceedings of the 23rd annual international symposium on Computer architecture, 1996, pp. 3-11, vol. 24, Issue 2, ACM, NY, NY, United States.

Farcy, Alexandre et al., Dataflow Analysis of Branch Mispredictions and Its Application to early Resolution of Branch Outcomes, Proceedings of the 31st annual ACM/IEEE international symposium on Microarchitecture, 1998, pp. 59-68, IEEE Computer Society, Los Alamitos, CA, United States.

Grunwald, D. et al., Static methods in hybrid prediction, Proceedings of the 1998 International Conference on Parallel Architectures and Compilation Techniques, 1998, pp. 222-229, IEEE Computer Society, Washington, D.C., United States.

McFarling, Scott, Combining Branch Predictors, Jun. 1993, Digital Equipment Corporation, Maynard, Massachusetts, United States.

Wallace, Steven et al., Threaded Multiple Path Execution, Proceedings of the 25th annual international symposium on Computer architecture, pp. 238-249, IEEE Computer Society, Washington, D.C., United States.

Yeh, Tse-Yu et al., Alternative Implementations of Two-Level Adaptive Branch Prediction, Proceedings of the 19th annual international symposium on Computer architecture, May 1992, pp. 124-134, vol. 20, Issue 2, ACM, NY, NY, United States.

Zilles, Craig et al., Execution-based Prediction Using Speculative Slices, Proceedings of the 28th annual international symposium on Computer architecture, May 2001, pp. 2-13, vol. 29, Issue 2, ACM, NY, NY, United States.

Aragon, Juan L. et al., Dual Path Instruction Processing, Proceedings of the 16th international conference on Supercomputing, 2002, pp. 220-229, ACM, NY, NY, United States.

* cited by examiner

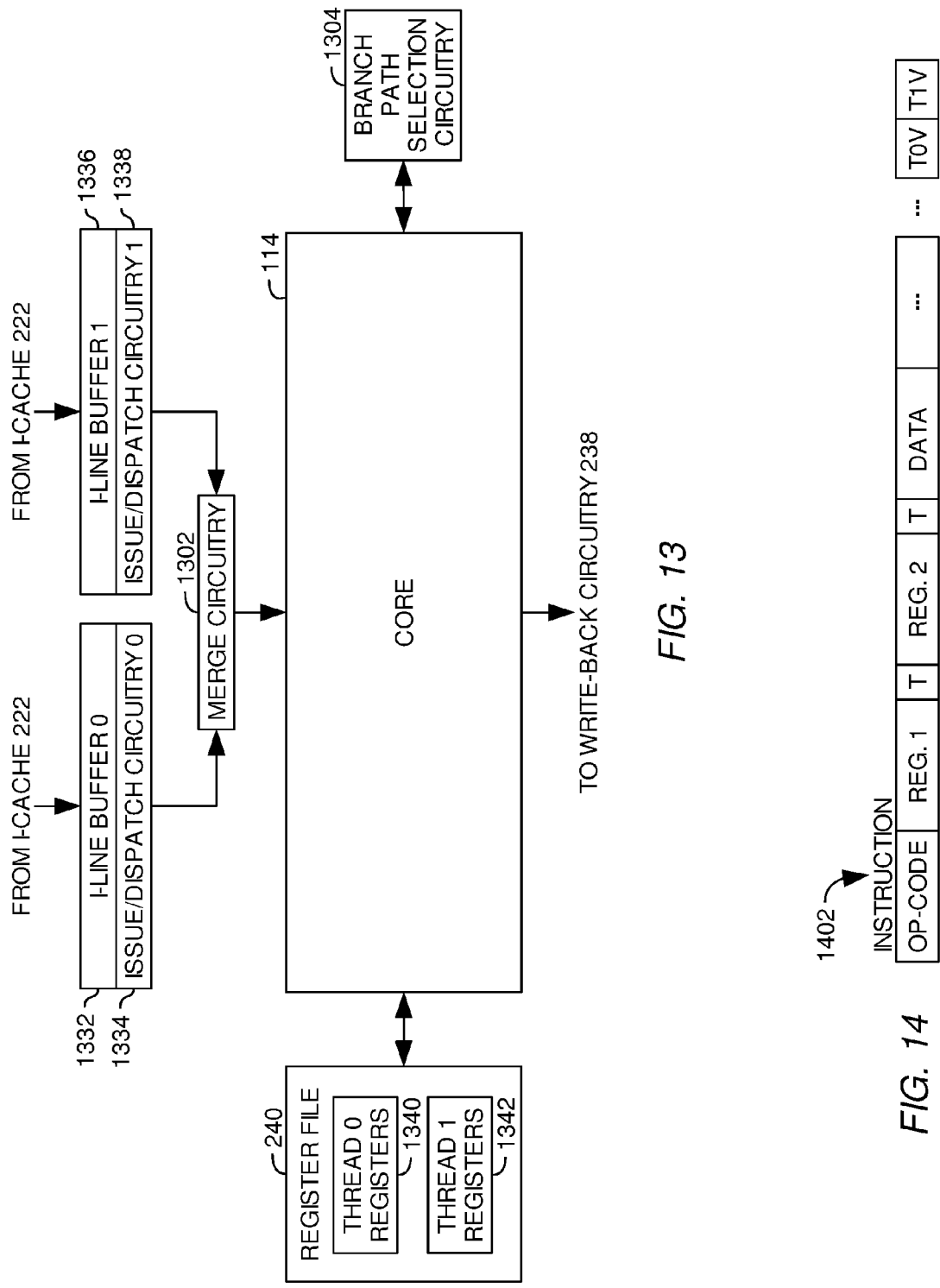

PREDICATED ISSUE FOR CONDITIONAL BRANCH INSTRUCTIONS

CROSS-REFERENCE TO RELATED APPLICATIONS

This application is related to U.S. application Ser. No. 11/422,905, filed on Jun. 8, 2006, entitled DUAL PATH ISSUE FOR CONDITIONAL BRANCH INSTRUCTIONS, U.S. application Ser. No. 11/422,906, filed on Jun. 8, 2006, entitled HYBRID BRANCH PREDICTION SCHEME, U.S. application Ser. No. 11/422,916, filed on Jun. 8, 2006, entitled EARLY CONDITIONAL BRANCH RESOLUTION, U.S. application Ser. No. 11/422,927, filed on Jun. 8, 2006, entitled LOCAL AND GLOBAL BRANCH PREDICTION INFORMATION STORAGE, and U.S. application Ser. No. 11/422,930, filed on Jun. 8, 2006, entitled DOUBLE-WIDTH INSTRUCTION QUEUE FOR INSTRUCTION EXECUTION. Each of the related patent application is herein incorporated by reference in its entirety.

BACKGROUND OF THE INVENTION

1. Field of the Invention

The present invention generally relates to executing instructions in a processor. Specifically, this application is related to increasing the efficiency of a processor executing branch instructions.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores, and in some cases, each processor core may have multiple pipelines. Where a processor core has multiple pipelines, groups of instructions (referred to as issue groups) may be issued to the multiple pipelines in parallel and executed by each of the pipelines in parallel.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time (in parallel).

Processors typically provide conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Typically, the outcome of the condition being tested is not known until the conditional branch instruction is executed and the condition is tested. Thus, the next instruction to be executed after the conditional branch instruction may not be known until the branch condition is tested.

Where a pipeline is utilized to execute instructions, the outcome of the conditional branch instruction may not be known until the conditional branch instruction has passed through several stages of the pipeline. Thus, the next instruction to be executed after the conditional branch instruction may not be known until the conditional branch instruction has passed through the stages necessary to determine the outcome of the branch condition. In some cases, execution of instructions in the pipeline may be stalled (e.g., the stages of the pipeline preceding the branch instruction may not be used to execute instructions) until the branch condition is tested and the next instruction to be executed is known. However, where the pipeline is stalled, the pipeline is not being used to execute as many instructions in parallel (because some stages before the conditional branch are not executing instructions), causing the benefit of the pipeline to be reduced and decreasing overall processor efficiency.

In some cases, to improve processor efficiency, branch prediction may be used to predict the outcome of conditional branch instructions. For example, when a conditional branch instruction is encountered, the processor may predict which instruction will be executed after the outcome of the branch condition is known. Then, instead of stalling the pipeline when the conditional branch instruction is issued, the processor may continue issuing instructions beginning with the predicted next instruction.

However, in some cases, the branch prediction may be incorrect (e.g., the processor may predict one outcome of the conditional branch instruction, but when the conditional branch instruction is executed, the opposite outcome may result). Where the outcome of the conditional branch instruction is mispredicted, the predicted instructions issued subsequently to the pipeline after the conditional branch instruction may be removed from the pipeline and the effects of the instructions may be undone (referred to as flushing the pipeline). Then, after the pipeline is flushed, the correct next instruction for the conditional branch instruction may be issued to the pipeline and execution of the instructions may continue. Where the outcome of a conditional branch instruction is incorrectly predicted and the incorrectly predicted group of instructions is flushed from the pipeline, thereby undoing previous work done by the pipeline, the efficiency of the processor may suffer.

Accordingly, what is needed is an improved method and apparatus for executing conditional branch instructions and performing branch prediction.

SUMMARY OF THE INVENTION

The present invention generally provides improved methods and apparatuses for executing instructions in a processor. In one embodiment, the method includes receiving a branch instruction, wherein a first path of the branch instruction branches to a target instruction, and wherein a second path of the branch instruction branches to one or more interceding instructions between the branch instruction and the target instruction. The method further includes issuing the one or more interceding instructions and the target instruction and determining if the branch instruction follows the first path or the second path. Upon determining that the branch instruction follows the first path, the one or more interceding instructions between the branch instruction and the target instruction are invalidated.

One embodiment of the invention also provides a processor including a cache and circuitry. The circuitry is configured to receive a branch instruction from the cache, wherein a first path of the branch instruction branches to a target instruction, and wherein a second path of the branch instruction branches to one or more interceding instructions between the branch instruction and the target instruction. The circuitry is further configured to issue the one or more interceding instructions and the target instruction and determine if the branch instruction follows the first path or the second path. Upon determining that the branch instruction follows the first path, the circuitry is configured to invalidate the one or more interceding instructions between the branch instruction and the target instruction.

One embodiment of the invention also provides a processor including a cache, one or more execution units, and circuitry. The circuitry is configured to receive a branch instruction from the cache, wherein a first path of the branch instruction branches to a target instruction, and wherein a second path of the branch instruction results in execution of one or more interceding instructions between the branch instruction and the target instruction. Before determining an outcome of the branch instruction, the circuitry is configured to issue the one or more interceding instructions and the target instruction to the one or more execution units. The circuitry is further configured to execute the branch instruction to determine if the branch instruction follows the first path or the second path. Upon determining that the branch instruction follows the first path, the circuitry is configured to invalidate the one or more interceding instructions between the branch instruction and the target instruction. Upon determining that the branch instruction follows the second path, the circuitry is configured to propagate results of the one or more interceding instructions between the branch instruction and the target instruction.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 13 is a block diagram depicting circuitry utilized for dual path issue of a conditional branch instruction according to one embodiment of the invention.

FIG. 14 is a block diagram depicting an exemplary instruction executed using simultaneous multithreading according to one embodiment of the invention.

DETAILED DESCRIPTION OF THE PREFERRED EMBODIMENTS

Figure 1:
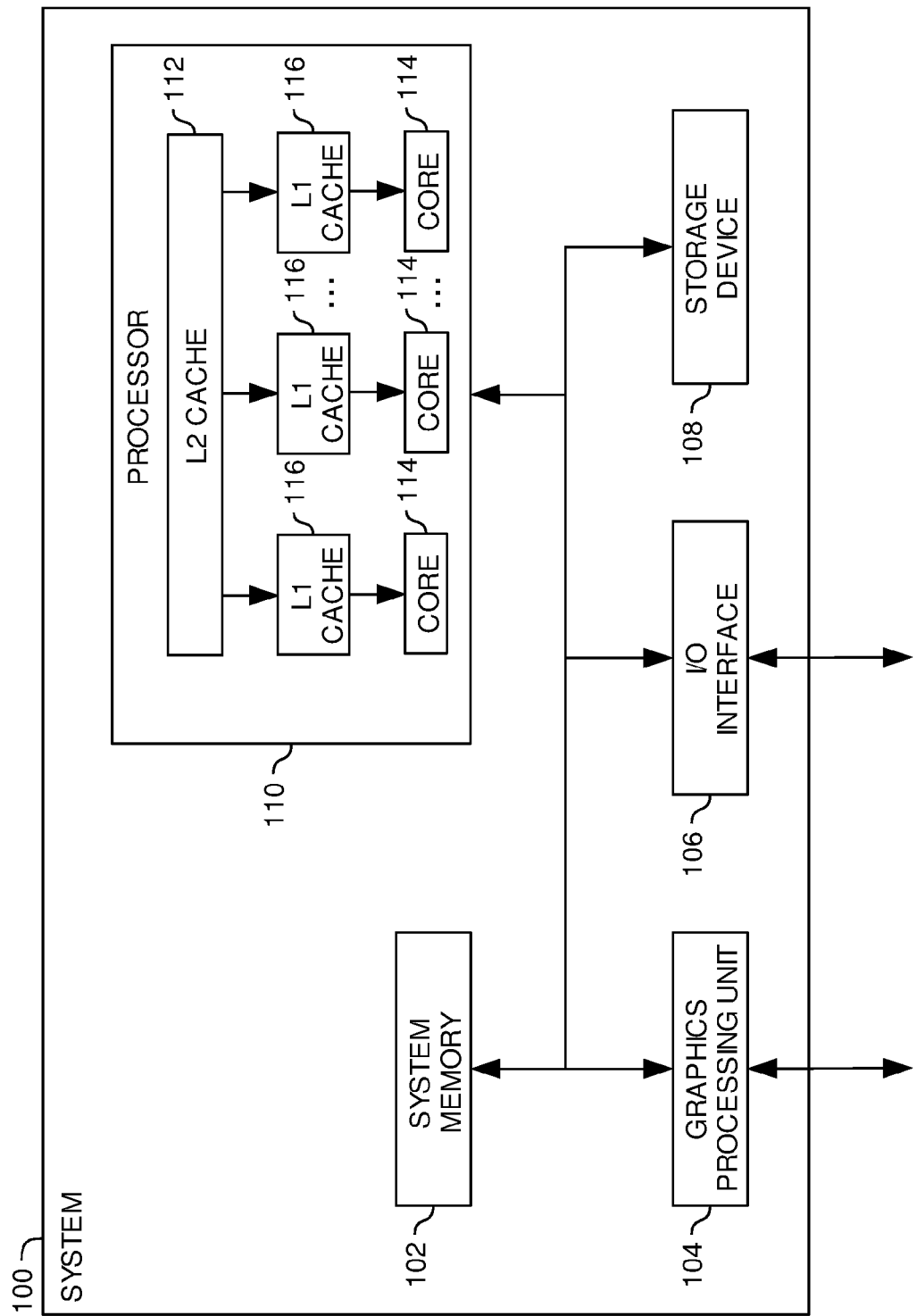
FIG. 1 is a block diagram depicting a system according to one embodiment of the invention.

The present invention generally provides a method and apparatus to execute instructions. In one embodiment, the method includes receiving a branch instruction, wherein a first path of the branch instruction branches to a target instruction, and wherein a second path of the branch instruction branches to one or more interceding instructions between the branch instruction and the target instruction. The method further includes issuing the one or more interceding instructions and the target instruction and determining if the branch instruction follows the first path or the second path. Upon determining that the branch instruction follows the first path, the one or more interceding instructions between the branch instruction and the target instruction are invalidated.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

While described below with respect to a processor having multiple processor cores and multiple L1 caches, wherein each processor core uses multiple pipelines to execute instructions, embodiments of the invention may be utilized with any processor which utilizes a cache, including processors which have a single processing core. In general, embodiments of the invention may be utilized with any processor and are not limited to any specific configuration. For example, in general, embodiments are not limited to processors which utilize cascaded, delayed execution pipelines. Furthermore, while described below with respect to a processor having an L1-cache divided into an L1 instruction cache (L1 I-cache, or I-cache) and an L1 data cache (L1 D-cache, or D-cache 224), embodiments of the invention may be utilized in configurations wherein a unified L1 cache is utilized. Also, in some embodiments described below, dual instruction buffers are described for buffering instructions. In some cases, a single, combined buffer, or other buffer configurations may be utilized to buffer instructions.

Overview of an Exemplary System

FIG. 1 is a block diagram depicting a system 100 according to one embodiment of the invention. The system 100 may contain a system memory 102 for storing instructions and data, a graphics processing unit 104 for graphics processing, an I/O interface for communicating with external devices, a storage device 108 for long term storage of instructions and data, and a processor 110 for processing instructions and data.

According to one embodiment of the invention, the processor 110 may have an L2 cache 112 as well as multiple L1 caches 116, with each L1 cache 116 being utilized by one of multiple processor cores 114. According to one embodiment, each processor core 114 may be pipelined, wherein each instruction is performed in a series of small steps with each step being performed by a different pipeline stage.

Figure 2:
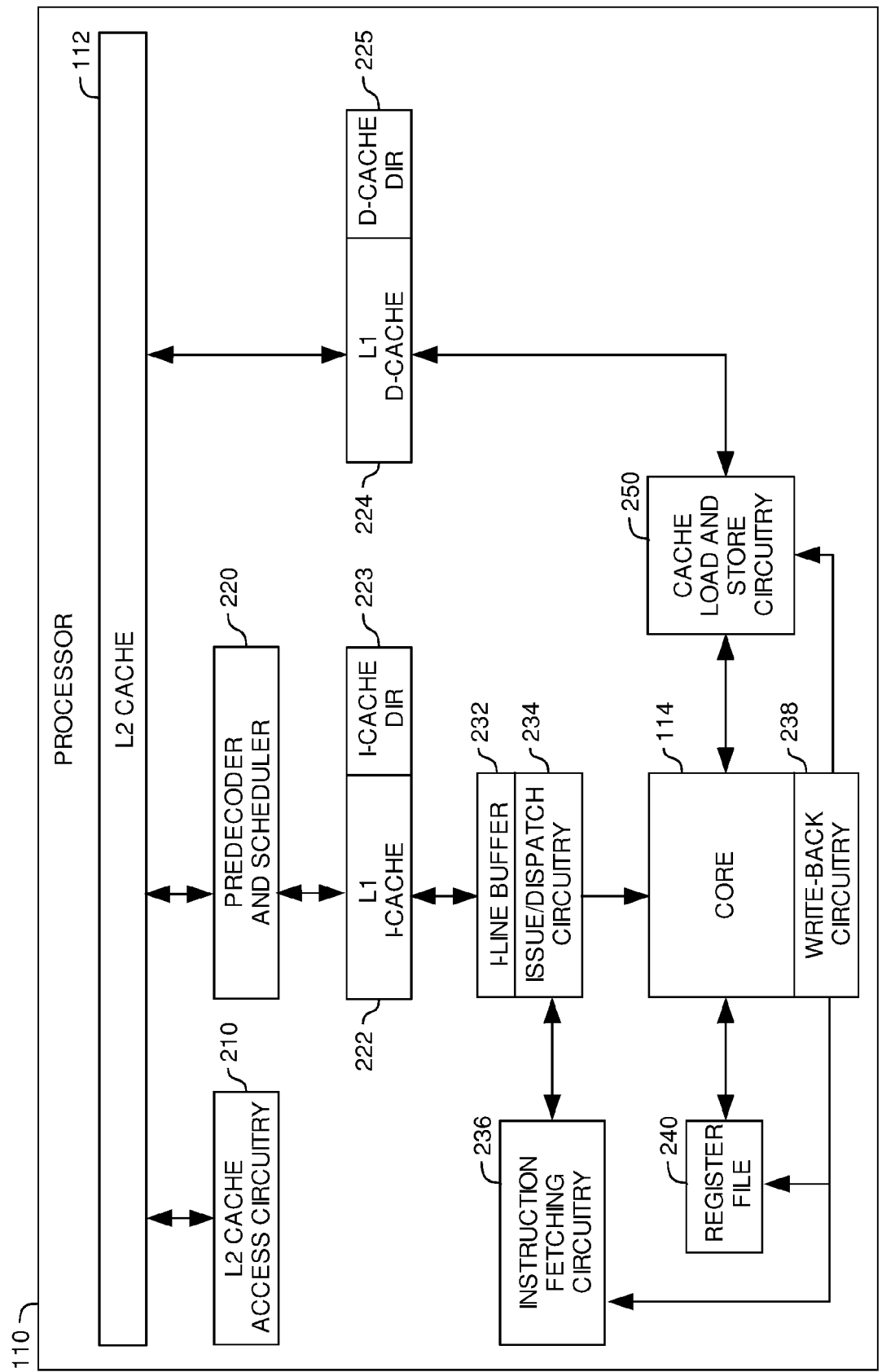
FIG. 2 is a block diagram depicting a computer processor according to one embodiment of the invention.

FIG. 2 is a block diagram depicting a processor 110 according to one embodiment of the invention. For simplicity, FIG. 2 depicts and is described with respect to a single core 114 of the processor 110. In one embodiment, each core 114 may be identical (e.g., contain identical pipelines with identical pipeline stages). In another embodiment, each core 114 may be different (e.g., contain different pipelines with different stages).

In one embodiment of the invention, the L2 cache may contain a portion of the instructions and data being used by the processor 110. In some cases, the processor 110 may request instructions and data which are not contained in the L2 cache 112. Where requested instructions and data are not contained in the L2 cache 112, the requested instructions and data may be retrieved (either from a higher level cache or system memory 102) and placed in the L2 cache. When the processor core 114 requests instructions from the L2 cache 112, the instructions may be first processed by a predecoder and scheduler 220 (described below in greater detail).

In one embodiment of the invention, instructions may be fetched from the L2 cache 112 in groups, referred to as I-lines. Similarly, data may be fetched from the L2 cache 112 in groups referred to as D-lines. The L1 cache 116 depicted in FIG. 1 may be divided into two parts, an L1 instruction cache 222 (I-cache 222) for storing I-lines as well as an L1 data cache 224 (D-cache 224) for storing D-lines. I-lines and D-lines may be fetched from the L2 cache 112 using L2 access circuitry 210.

In one embodiment of the invention, I-lines retrieved from the L2 cache 112 may be processed by a predecoder and scheduler 220 and the I-lines may be placed in the I-cache 222. To further improve processor performance, instructions are often predecoded, for example, I-lines are retrieved from L2 (or higher) cache. Such predecoding may include various functions, such as address generation, branch prediction, and scheduling (determining an order in which the instructions should be issued), which is captured as dispatch information (a set of flags) that control instruction execution. In some cases, the predecoder and scheduler 220 may be shared among multiple cores 114 and L1 caches. Similarly, D-lines fetched from the L2 cache 112 may be placed in the D-cache 224. A bit in each I-line and D-line may be used to track whether a line of information in the L2 cache 112 is an I-line or D-line. Optionally, instead of fetching data from the L2 cache 112 in I-lines and/or D-lines, data may be fetched from the L2 cache 112 in other manners, e.g., by fetching smaller, larger, or variable amounts of data.

In one embodiment, the I-cache 222 and D-cache 224 may have an I-cache directory 223 and D-cache directory 225 respectively to track which I-lines and D-lines are currently in the I-cache 222 and D-cache 224. When an I-line or D-line is added to the I-cache 222 or D-cache 224, a corresponding entry may be placed in the I-cache directory 223 or D-cache directory 225. When an I-line or D-line is removed from the I-cache 222 or D-cache 224, the corresponding entry in the I-cache directory 223 or D-cache directory 225 may be removed. While described below with respect to a D-cache 224 which utilizes a D-cache directory 225, embodiments of the invention may also be utilized where a D-cache directory 225 is not utilized. In such cases, the data stored in the D-cache 224 itself may indicate what D-lines are present in the D-cache 224.

In one embodiment, instruction fetching circuitry 236 may be used to fetch instructions for the core 114. For example, the instruction fetching circuitry 236 may contain a program counter which tracks the current instructions being executed in the core. A branch unit within the core may be used to change the program counter when a branch instruction is encountered. An I-line buffer 232 may be used to store instructions fetched from the L1 I-cache 222. Issue and dispatch circuitry 234 may be used to group instructions retrieved from the I-line buffer 232 into instruction groups which may then be issued in parallel to the core 114 as described below. In some cases, the issue and dispatch circuitry may use information provided by the predecoder and scheduler 220 to form appropriate instruction groups.

In addition to receiving instructions from the issue and dispatch circuitry 234, the core 114 may receive data from a variety of locations. Where the core 114 requires data from a data register, a register file 240 may be used to obtain data. Where the core 114 requires data from a memory location, cache load and store circuitry 250 may be used to load data from the D-cache 224. Where such a load is performed, a request for the required data may be issued to the D-cache 224. At the same time, the D-cache directory 225 may be checked to determine whether the desired data is located in the D-cache 224. Where the D-cache 224 contains the desired data, the D-cache directory 225 may indicate that the D-cache 224 contains the desired data and the D-cache access may be completed at some time afterwards. Where the D-cache 224 does not contain the desired data, the D-cache directory 225 may indicate that the D-cache 224 does not contain the desired data. Because the D-cache directory 225 may be accessed more quickly than the D-cache 224, a request for the desired data may be issued to the L2 cache 112 (e.g., using the L2 access circuitry 210) after the D-cache directory 225 is accessed but before the D-cache access is completed.

In some cases, data may be modified in the core 114. Modified data may be written to the register file, or stored in memory. Write back circuitry 238 may be used to write data back to the register file 240. In some cases, the write back circuitry 238 may utilize the cache load and store circuitry 250 to write data back to the D-cache 224. Optionally, the core 114 may access the cache load and store circuitry 250 directly to perform stores. In some cases, as described below, the write-back circuitry 238 may also be used to write instructions back to the I-cache 222.

As described above, the issue and dispatch circuitry 234 may be used to form instruction groups and issue the formed instruction groups to the core 114. The issue and dispatch circuitry 234 may also include circuitry to rotate and merge instructions in the I-line and thereby form an appropriate instruction group. Formation of issue groups may take into account several considerations, such as dependencies between the instructions in an issue group as well as optimizations which may be achieved from the ordering of instructions as described in greater detail below. Once an issue group is formed, the issue group may be dispatched in parallel to the processor core 114. In some cases, an instruction group may contain one instruction for each pipeline in the core 114. Optionally, the instruction group may a smaller number of instructions.

Figure 3:
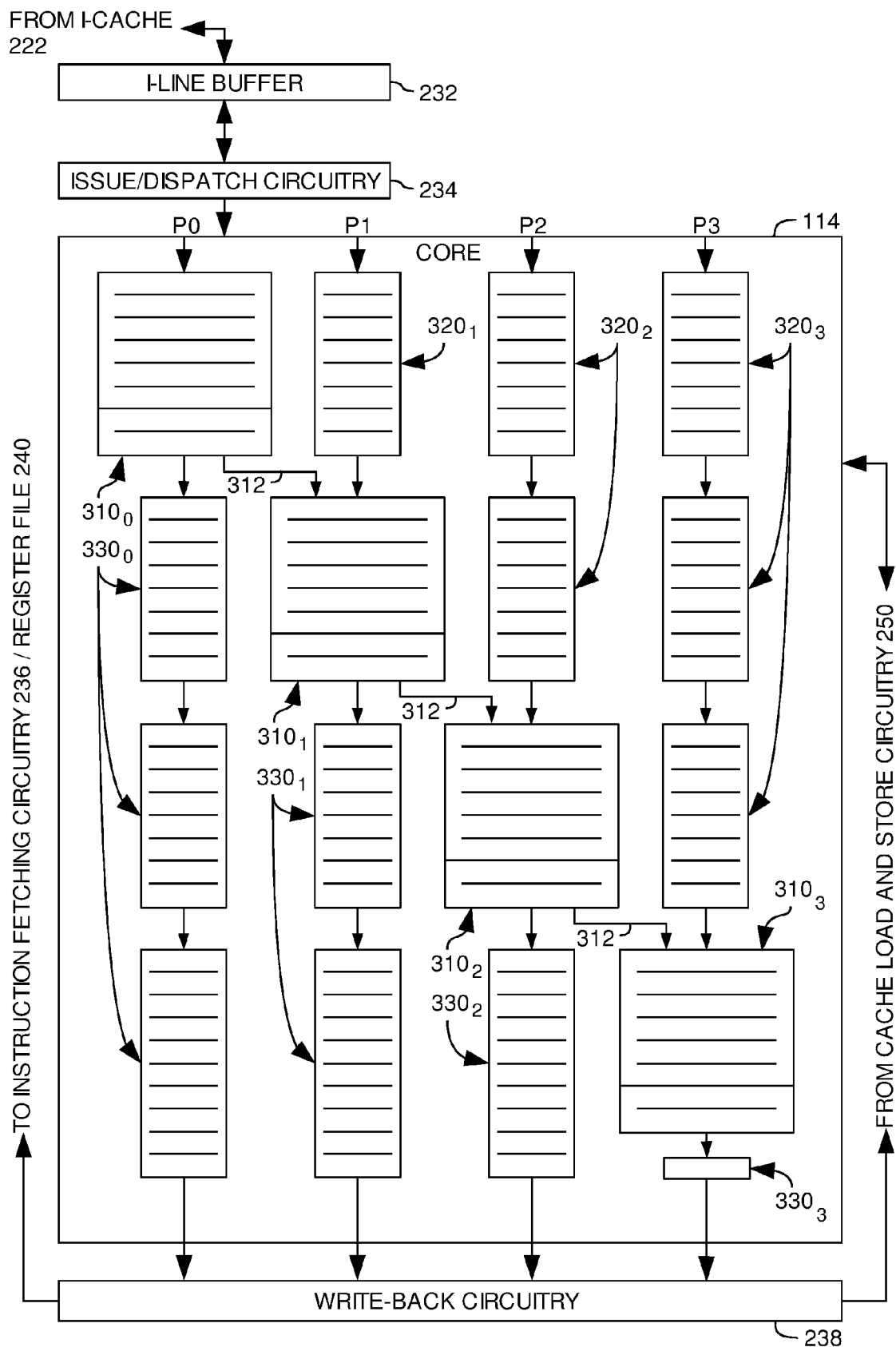
FIG. 3 is a block diagram depicting one of the cores of the processor according to one embodiment of the invention.

According to one embodiment of the invention, one or more processor cores 114 may utilize a cascaded, delayed execution pipeline configuration. In the example depicted in FIG. 3, the core 114 contains four pipelines in a cascaded configuration. Optionally, a smaller number (two or more pipelines) or a larger number (more than four pipelines) may be used in such a configuration. Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) in the cascaded, delayed execution pipeline configuration may contain an execution unit 310. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler 220 which is shared among multiple cores 114 or, optionally, which is utilized by a single core 114. The execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in the register file 240). In some cases, the core 114 may utilize instruction fetching circuitry 236, the register file 240, cache load and store circuitry 250, and write-back circuitry, as well as any other circuitry, to perform these functions.

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_2$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. In such a configuration, where instructions (referred to, for convenience, as I0, I1, I2, I3) in an instruction group are issued in parallel to the pipelines P0, P1, P2, P3, each instruction may be executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so one, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not been executed by an execution unit 310. For example, while instruction I0 is being executed in execution unit $310_0$, instructions I1, I2, and I3 may be held in a delay queue 330. Once the instructions have moved through the delay queues 330, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to the register file or the L1 I-cache 222 and/or D-cache 224. In some cases, the write-back circuitry 306 may be used to write back the most recently modified value of a register (received from one of the target delay queues 330) and discard invalidated results.

Branch Prediction Information

In one embodiment of the invention, the processor 110 may store branch prediction information for conditional branch instructions being executed by the processor 110. Branch prediction information may reflect the execution history of a given branch instruction and/or may be useful in predicting the outcome of the branch instruction during execution.

In one embodiment of the invention, the processor 110 may be utilized to record local branch history information and/or global branch history information. As described below, in some cases, such branch prediction information may be re-encoded into a branch instruction. Also, in some cases, branch prediction information may be stored in a branch history table.

In one embodiment, local branch history information may be used to track the branch history of a single branch instruction. In some cases, local branch history information may include a single bit (the branch history bit, BRH) which indicates whether a branch was previously taken or previously not taken (e.g., if the bit is set, the branch was previously taken, and if the bit is not set, the branch was previously not taken). Where BRH is set, during a subsequent execution of the branch instruction, a prediction may be made that the branch will be taken, allowing the processor 110 to fetch and execute instructions for the branch taken path before the outcome of the branch instruction has been fully resolved. Similarly, where BRH is cleared, a prediction may be made that the branch will not be taken, allowing the processor 110 to fetch and execute instructions for the branch not taken path.

Local branch history information may also include a counter (CNT) which may be used to determine the reliability of the branch history bit in predicting the outcome of the branch instruction. For example, each time the branch outcome (taken or not taken) matches the value of BRH, the counter may be incremented, thereby indicating that the BRH prediction is more reliable. For some embodiments, the counter may saturate once the counter reaches its highest value (e.g., a 3-bit counter may saturate at seven). Similarly, each time the branch outcome does not match the value of BRH, the counter may be decremented, indicating that the BRH prediction is less reliable. The counter may also stop decrementing, when the counter reaches its lowest value (e.g., at zero). The counter may be a one bit counter, two bit counter, or three bit counter, or, optionally, the counter may include any number of bits.

In some cases, another bit (BPRD) of local branch history information may be stored which indicates whether the local branch history information accurately predicts the outcome of the branch instruction (e.g., whether the branch instruction is locally predictable). For example, where CNT is below a threshold for local predictability, BPRD may be cleared, indicating that the branch instruction is not predictable. Where CNT is above or equal to a threshold for local predictability, BPRD may be set, indicating that the branch instruction is predictable. In some cases, BPRD may be initialized to a value which indicates that the branch instruction is locally predictable (e.g., BPRD may be initially cleared). Also, in some cases, once BPRD is cleared, BPRD may remain cleared (e.g., BPRD may be a sticky bit), even if CNT rises above a threshold for predictability, thereby indicating that the branch instruction remains locally unpredictable. Optionally, BPRD may be continuously updated depending on the value of CNT.

In some cases, CNT may be initialized to a value which indicates that the branch is predictable or partially predictable (e.g., a value which is above a threshold for predictability or above a threshold for "partial predictability"). Also, in some cases, when CNT is below a threshold for predictability, or optionally, when CNT is zero, the BRH bit may be modified to reflect the most recent outcome (e.g., taken or not-taken) of the branch instruction. In some cases, where BRH is modified to reflect the most recent outcome, BPRD may remain set (indicating unpredictability) until CNT rises above a threshold for predictability. By maintaining a measurement and/or bits indicating the local predictability of the branch instruction, a determination may be made of whether to use the local branch history information to predict the outcome of the branch instruction.

Global branch history information may be used to track the branch history of multiple instructions. For example, global branch history information for a given branch instruction may look at a number of branch instructions (e.g., one, two, three, four, or more) which were executed before the current branch instruction and record whether the branches were taken or not taken. Bits indicating the historical outcome of the previous branch instructions (GBH) may be used as an index into the branch history table along with the address of the branch instruction being executed. Each entry in the branch history table may contain a corresponding global branch history bit (GBRH) which indicates what the corresponding outcome of the branch was (e.g., for the historical outcome of the previous branch instructions, GBH, what was the outcome of the current branch instruction, GBRH).

In some cases, each entry in the branch history table may contain a global branch history counter (GBCNT) similar to the counter described above. Each time the global branch history GBRH correctly predicts the outcome of a branch instruction, GBCNT may be incremented, and each time the global branch history entry incorrectly predicts the outcome of a branch instruction, GBCNT may be decremented. The value of GBCNT may be used to determine the reliability or predictability of the global branch history for the branch instruction.

In some cases, the global branch history information may include a bit GBPRD, similar to BPRD, which is set where GBCNT is above or equal to a threshold for predictability and cleared when GBCNT is below a threshold for predictability. Thus, GBPRD may be used to determine whether a branch instruction is globally predictable. In some cases, GBPRD may be a sticky bit (e.g., once the bit is cleared, the bit may remain cleared). Optionally, in some cases, GBPRD may be updated depending on the value of GBCNT.

Storage of Branch Prediction Information

In one embodiment of the invention, local branch history information may be re-encoded into a corresponding branch instruction or I-line during execution. By re-encoding the local branch history information in the corresponding branch instruction, the size of the branch history table used to store branch prediction information may be reduced and essentially unlimited storage of local branch history information may be provided (e.g., in or with the branch instructions themselves). Also, in one embodiment of the invention, global branch history information may only be stored in the branch history table if the local branch history information is unreliable (e.g., if the confirmation count CNT is below a given threshold value for local predictability). Thus, in some cases, global branch history information for a given branch instruction may be stored only if the local branch history for that instruction is not acceptably accurate for predicting the outcome of the branch instruction.

Figure 4:
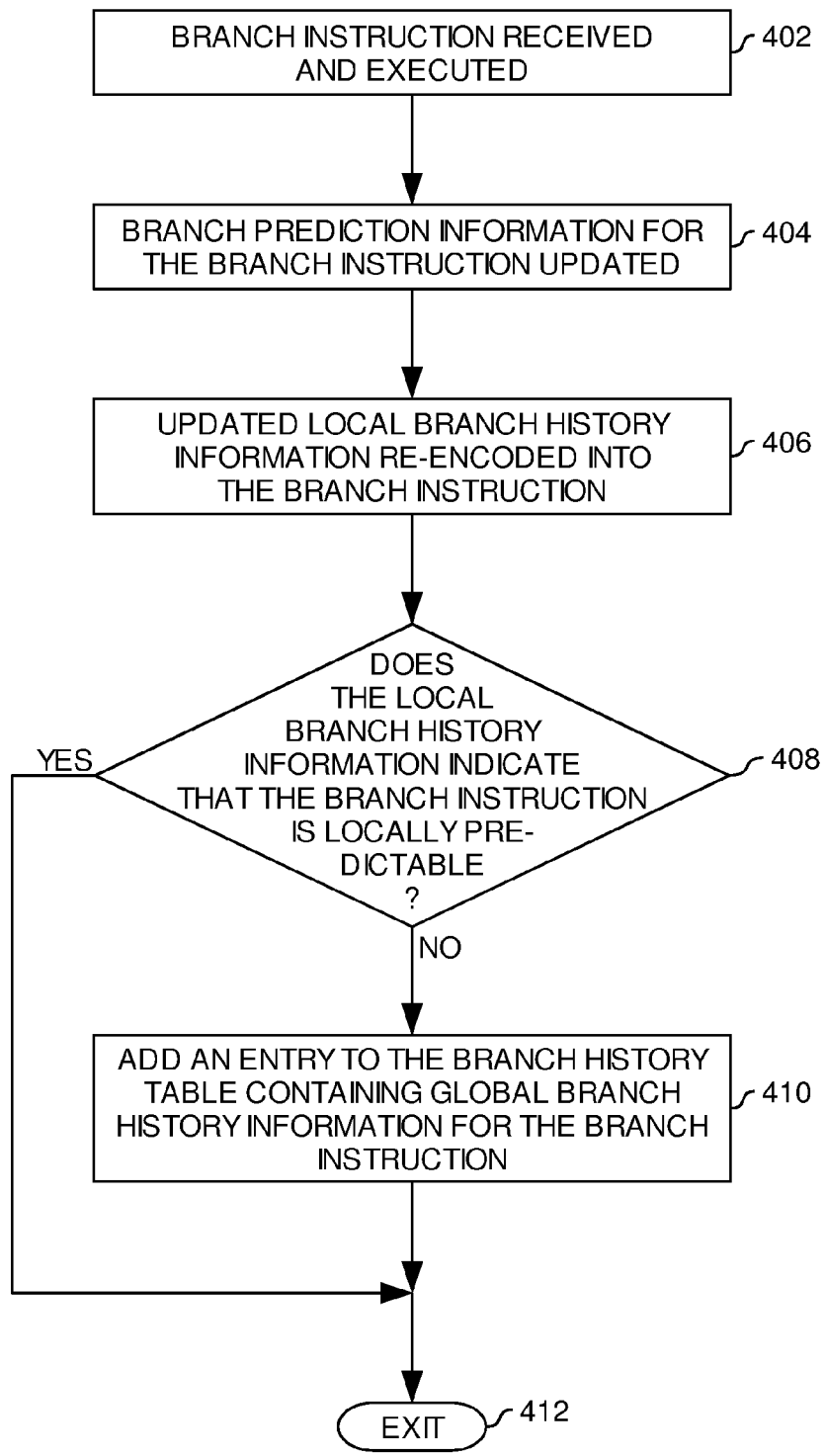
FIG. 4 is a flow diagram depicting a process for recording and storing local and global branch history information according to one embodiment of the invention.

FIG. 4 is a flow diagram depicting a process 400 for recording and storing local and global branch history information according to one embodiment of the invention. The process 400 may begin at step 402 where a branch instruction is received and executed. At step 404, branch prediction information for the branch instruction may be updated, for example, as described above (e.g., by setting or clearing branch history bits, incrementing or decrementing branch history counters, etc.). At step 406, updated local branch history information (e.g., BRH, CNT, and/or other local branch history information) may be re-encoded into the branch instruction.

At step 408, a determination may be made of whether the local branch history information indicates that the branch instruction is locally predictable (e.g., that the branch is predictable using solely the local branch history). As described above, such a determination may include determining whether CNT is greater than or equal to a threshold for predictability. If not, then an entry may be added to the branch history table containing global branch history information (e.g., GBRH and/or GBCNT) for the branch instruction at step 410. The process 400 may then finish at step 412.

Figures 5A, 5B, 6:
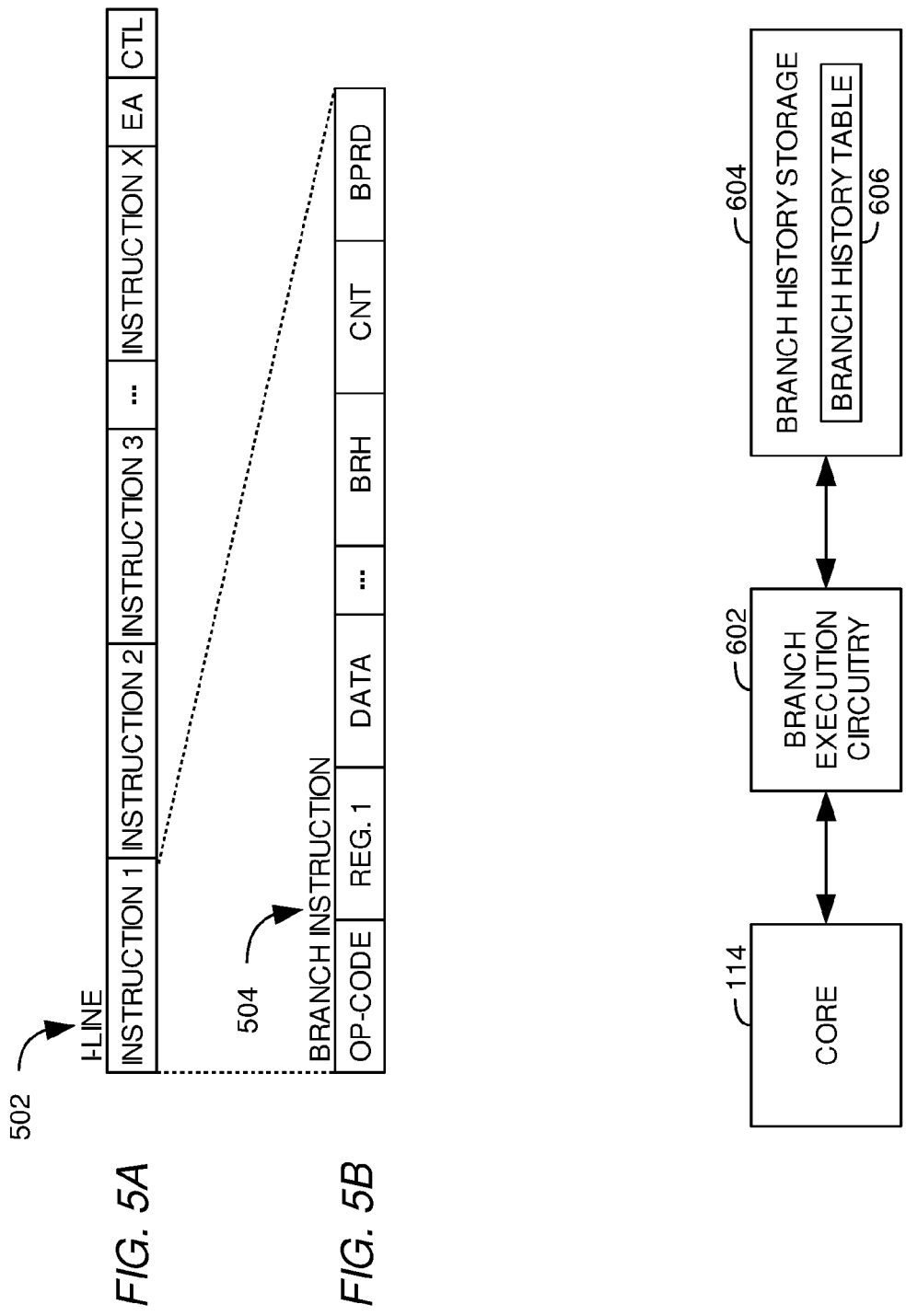
FIG. 5A is a block diagram depicting an exemplary instruction line (I-line) used to store local branch history information for a branch instruction in the I-line according to one embodiment of the invention.
FIG. 5B is a block diagram depicting an exemplary branch instruction according to one embodiment of the instruction.
FIG. 6 is a block diagram depicting circuitry for storing branch prediction information according to one embodiment of the invention.

As described above, local branch history information may be storied in a variety of ways which may include using instruction bits and/or I-line bits. In one embodiment, local branch history information and/or target addresses may be stored in an I-line containing the branch instruction. FIG. 5A is a block diagram depicting an exemplary I-line 502 used to store local branch history information and/or target addresses for a branch instruction in the I-line 502 according to one embodiment of the invention.

As depicted, the I-line may contain multiple instructions (Instruction 1, Instruction 2, etc.), bits used to store an address (for example, an effective address, EA), and bits used to store control information (CTL). In one embodiment of the invention, the control bits CTL depicted in FIG. 5A may be used to store local branch history information (e.g., the BRH bit, BPRD bit, CNT bits, and/or other bits) for a branch instruction. In one embodiment of the invention, an I-line may contain multiple branch instructions, and local branch history information may be stored for each of the branch instructions.

In some cases, the local branch history information may be stored in bits allocated for that purpose in the I-line. Optionally, in one embodiment of the invention, the local branch history information may be stored in otherwise unused bits of the I-line. For example, each information line in the L2 cache 112 may have extra data bits which may be used for error correction of data transferred between different cache levels (e.g., an error correction code, ECC, used to ensure that transferred data is not corrupted and to repair any corruption which does occur). In some cases, each level of cache (e.g., the L2 cache 112 and the I-cache 222) may contain an identical copy of each I-line. Where each level of cache contains a copy of a given I-line, an ECC may not be utilized. Instead, for example, a parity bit may used to determine if an I-line was properly transferred between caches. If the parity bit indicates that an I-line is improperly transferred between caches, the I-line may be refetched from the transferring cache (because the transferring cache is inclusive of the line) instead of performing error checking, thus freeing ECC bits for use in storing branch prediction information.

As an example of storing local branch history information in otherwise unused bits of an I-line, consider an error correction protocol which uses eleven bits for error correction for every two words stored. In an I-line, one of the eleven bits may be used to store a parity bit for every two instructions (where one instruction is stored per word). The remaining five bits per instruction may be used to store local branch history information.

As described above, in some cases, local branch history information may be stored in the branch instruction after the instruction is decoded and/or executed (generally referred to herein as re-encoding). FIG. 5B is a block diagram depicting an exemplary branch instruction 504 according to one embodiment of the instruction. The branch instruction 504 may contain an Operation Code (Op-Code) used to identify the type of instruction, one or more register operands (Reg. 1), and/or data. As depicted, the branch instruction 504 may also contain bits used to store BRH, BPRD, and/or CNT bits.

When the branch instruction 504 is executed, the local branch history information may be modified, for example, as described above. The local branch history information may then be encoded into the instruction 504, such that when the instruction is subsequently decoded, the local branch history information may be utilized to predict the outcome of the branch instruction. As described below, in some cases, when a branch instruction 504 is re-encoded, the I-line containing that instruction may be marked as changed and written back to the I-cache 222.

In one embodiment of the invention, where local branch history information is re-encoded into I-lines or branch instructions, each level of cache and/or memory used in the system 100 may contain a copy of the re-encoded information contained in the I-lines or branch instructions. In another embodiment of the invention, only specified levels of cache and/or memory may contain the re-encoded information contained in the instructions and/or I-line. Cache coherency principles, known to those skilled in the art, may be used to update copies of the I-line in each level of cache and/or memory.

It is noted that in traditional systems which utilize instruction caches, instructions are typically not modified by the processor 110. Thus, in traditional systems, I-lines are typically aged out of the I-cache 222 after some time instead of being written back to the L2 cache 112. However, as described herein, in some embodiments, modified I-lines and/or instructions may be written back to the L2 cache 112, thereby allowing the local branch history information (and/or other types of information/flags) to be maintained at higher cache and/or memory levels. By writing instruction information back into higher cache levels, previously calculated instruction information and results (e.g., information calculated during predecoding and/or execution of the instructions) may be subsequently reused without requiring the calculation to be repeated. By reusing stored instruction information and reducing recalculation of instruction information, during subsequent predecode and scheduling the power consumed in predecoding and executing the instruction may be reduced.

As an example, when predecoded instructions in an I-line have been processed by the processor core (possibly causing the local branch history information to be updated), the I-line may be written into the I-cache 222 (e.g., using write back circuitry 238), possibly overwriting an older version of the I-line stored in the I-cache 222. In one embodiment, the I-line may only be placed in the I-cache 222 where changes have been made to information stored in the I-line. Optionally, in one embodiment, I-lines may always be written back to the I-cache 222.

According to one embodiment of the invention, when a modified I-line is written back into the I-cache 222, the I-line may be marked as changed. Where an I-line is written back to the I-cache 222 and marked as changed, the I-line may remain in the I-cache for differing amounts of time. For example, if the I-line is being used frequently by the processor core 114, the I-line may be fetched and returned to the I-cache 222 several times, possibly be updated each time. If, however, the I-line is not frequently used (referred to as aging), the I-line may be purged from the I-cache 222. When the I-line is purged from the I-cache 222, a determination may be made of whether the I-line is marked as changed. Where the I-line is marked as changed, the I-line may be written back into the L2 cache 112. Optionally, the I-line may always be written back to the L2 cache 112. In one embodiment, the I-line may optionally be written back to several cache levels at once (e.g., to the L2 cache 112 and the I-cache 222) or to a level other than the I-cache 222 (e.g., directly to the L2 cache 112).

In one embodiment, bits in the branch instruction 504 may be re-encoded after the instruction has been executed, as described above. In some cases, the local branch history information may also be encoded in the instruction when the instruction is compiled from higher level source code. For example, in one embodiment, a compiler used to compile the source code may be designed to recognize branch instructions, generate local branch history information, and encode such information in the branch instructions.

For example, once the source code of a program has been created, the source code may be compiled into instructions and the instructions may then be executed during a test execution (or "training"). The test execution and the results of the test execution may be monitored to generate local branch history information for branch instructions in the program. The source code may then be recompiled such that the local branch history information for the branch instruction is set to appropriate values in light of the test execution. In some cases, the test execution may be performed on the processor 110. In some cases, control bits or control pins in the processor 110 may be used to place the processor 110 in a special test mode for the test execution. Optionally, a special processor, designed to perform the test execution and monitor the results, may be utilized.

FIG. 6 is a block diagram depicting circuitry for storing branch prediction information according to one embodiment of the invention. In some cases, the processor core 114 may utilize branch execution circuitry 602 to execute branch instructions and record branch prediction information. Also, the branch execution circuitry 602 may be used to control and access branch history storage 604. The branch history storage 604 may include, for example, the branch history table 606.

Figure 7:
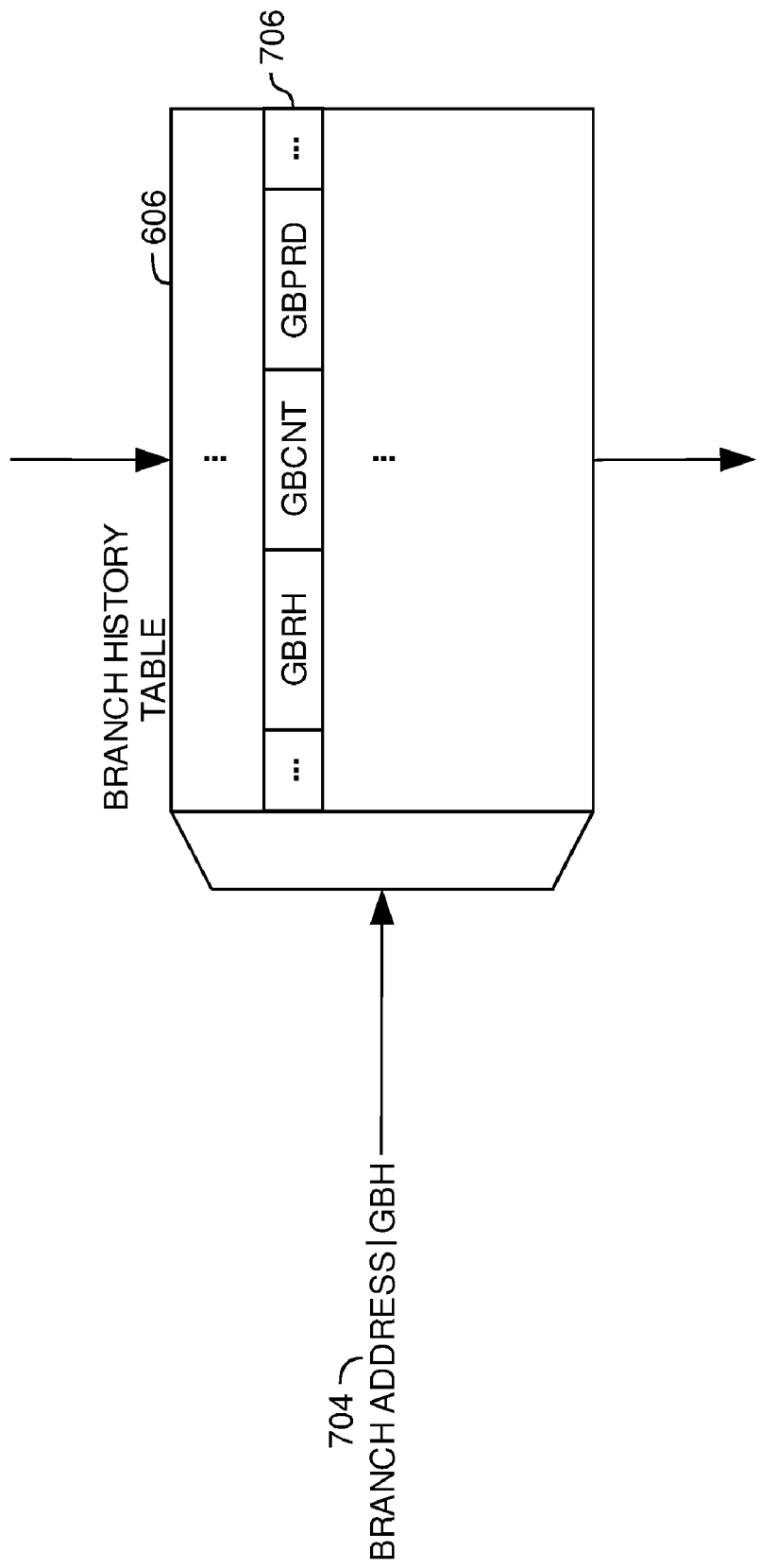
FIG. 7 is a block diagram depicting a branch history table according to one embodiment of the invention.

FIG. 7 is a block diagram depicting a branch history table 606 according to one embodiment of the invention. As described above, entries 706 may be placed in the branch history table describing the global branch history (e.g., GBRH, GBCNT, and/or GBPRD) of a branch instruction. In some cases, such entries may be made only if the branch instruction is locally unpredictable. Thus, the branch history table 606 may not contain entries for all of the branch instructions being executed by a processor 110. The address of a branch instruction (branch instruction address) and bits indicating the global branch history may be utilized as an index 704 into the branch history table 606. Optionally, in some cases, only a portion of the branch instruction address (e.g., only eight bits of the branch instruction address in addition to five bits indicating the global branch history) may be used as an index 704 into the branch history table 606.

Any suitable number of bits may be utilized to index the global branch history (e.g., one, two, three, four, five, or more). For example, each bit may indicate whether a corresponding previous conditional branch instruction resulted in the branch instruction being taken or not taken (e.g., bit 0 of GBH may be set if the previous branch instruction was taken, or cleared if the previous branch instruction was not taken, bit 1 of GBH may be set or cleared depending on the outcome of the preceding conditional branch instruction, and so on).

In one embodiment of the invention, entries 706 in the branch history table 706 may be maintained as long as the corresponding conditional branch instruction is cached in the processor 110 (e.g., in the I-cache 222, L2 cache 112, an L3 cache, and/or any other cache level). In some cases, the entry 706 for a branch instruction may remain only if the branch instruction is in certain levels of cache (e.g., only when the branch instruction is in the I-cache 222 or the L2 cache 112). Optionally, the entries 706 may be aged out of the branch history table 606, e.g., using an age value which indicates the most recent access to the entry 706. For example, once the age value for an entry 706 rises above an age threshold, thereby indicating that the entry 706 is not frequently used, then the entry 706 may be removed from the branch history table 706. Optionally, any other cache maintenance technique known to those skilled in the art may be used to maintain entries 706 in the branch history table 606.

In some cases, in addition to the techniques described above for maintaining entries 706 in the branch history table 606, entries 706 in the branch history table may be removed if the local branch history information for a branch instruction indicates that the branch instruction is locally predictable. For example, if the branch instruction was previously locally unpredictable and global branch history information was stored as a result, if the branch instruction later becomes locally predictable, the entries 706 containing the global branch history information may be removed from the branch history table 606. Thus, global branch history information may, in some cases, not be unnecessarily stored in the branch history table 606.

In some cases, both local and global branch history information may be stored in tables (e.g., a local branch history table in addition to a global branch history table), wherein entries are made in the global branch history table only when entries in the local branch history table indicate that the branch instruction is locally unpredictable. Also, in some cases, both the global branch history and the local branch history may be stored by appending such information to an I-line and/or re-encoding such information in an instruction. For example, in one embodiment, local branch history information may be re-encoded into each branch instruction while global branch history for a branch is appended to the I-line containing the branch instruction. In one embodiment, the global branch history for a given instruction may be appended to the I-line containing the instruction only if the branch instruction is not locally predictable.

Preresolution of Conditional Branches

In some cases, the outcome of a conditional branch instruction may be pre-resolvable (e.g., the outcome of the conditional may be determined before the branch instruction is executed according to program order, e.g., by trial issuing and executing the conditional branch instruction out-of-order). In cases where a conditional branch instruction is pre-resolvable, the outcome of the conditional branch instruction (e.g., taken or not-taken) may be determined before the conditional branch instruction is executed in the processor core 114. The determined outcome may then be used to schedule execution of instructions (e.g., by fetching, scheduling, and issuing instructions to the processor core 114 along the pre-resolved path for the conditional branch instruction). Thus, in some cases, branch prediction information (e.g., information from a previous execution of a branch instruction) may not be utilized to determine whether a conditional branch will be taken or not taken.

Figure 8:
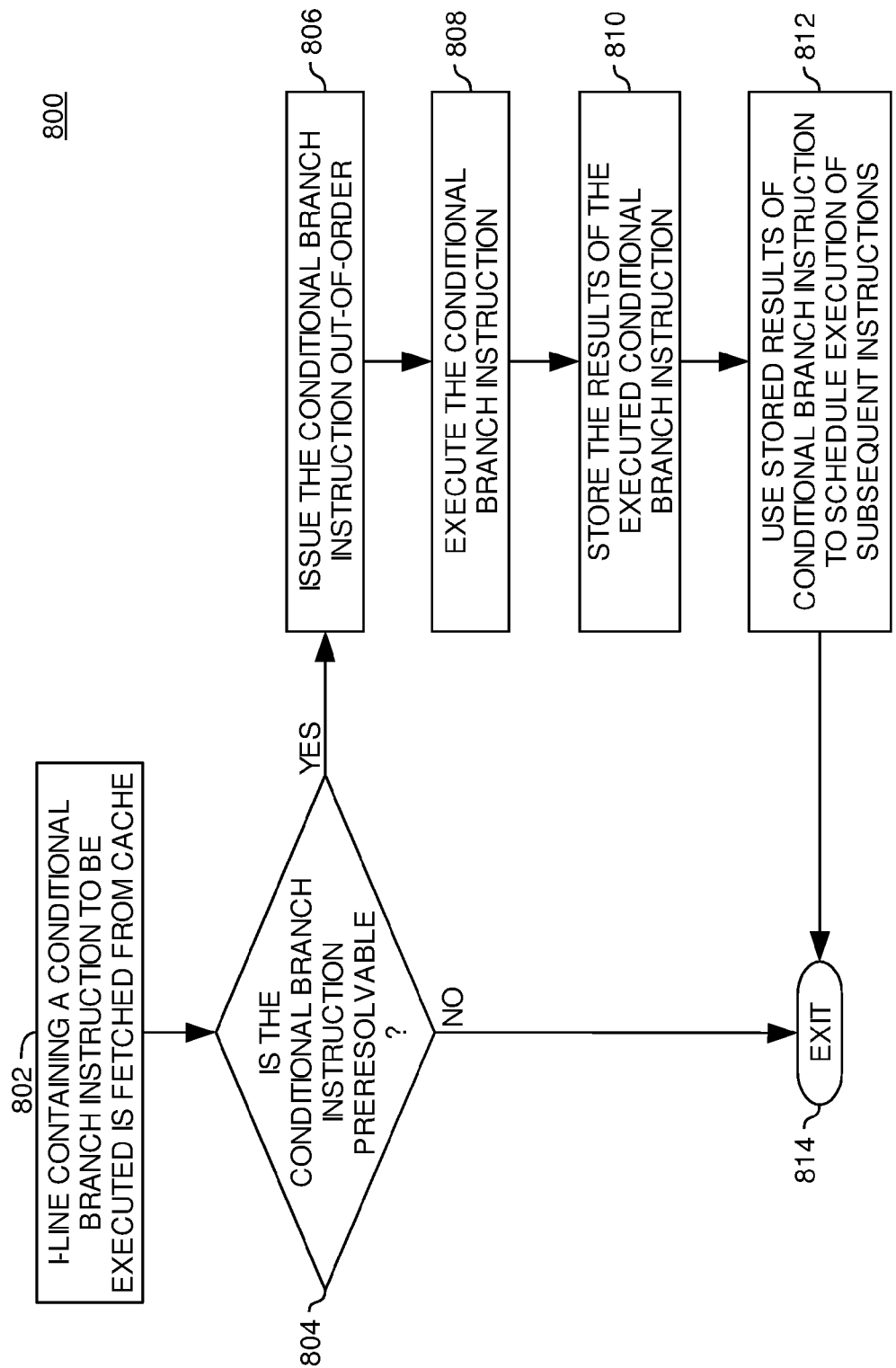
FIG. 8 is a flow diagram depicting a process for preresolving a conditional branch instruction according to one embodiment of the invention.

FIG. 8 is a flow diagram depicting a process 800 for pre-resolving a conditional branch instruction according to one embodiment of the invention. The process 800 may begin at step 802 where an I-line containing a conditional branch instruction to be executed is fetched from a cache (e.g., from the L2 cache 112 or the I-cache 222). At step 804, a determination may be made of whether the conditional branch instruction is preresolvable. If the conditional branch instruction is preresolvable, the branch instruction may be trial issued out-of-order to the processor core 114 at step 806. At step 808, the conditional branch instruction may be executed, thereby preresolving the outcome of the conditional branch instruction (e.g., taken or not taken). Then, at step 810, the outcome of the preresolution of the branch instruction may be stored. At step 812, during scheduling, the stored outcome of the branch instruction may be used to schedule execution of subsequent instructions. The process 800 may then finish at step 814.

As described above, a determination may be made of whether a conditional branch instruction is preresolvable. A conditional branch instruction may be preresolvable in a variety of instances. For example, a conditional branch instruction may check a bit in a condition register (CR) to determine whether to branch to another instruction. Where the bit in the condition register has been set and will not be modified by any instructions preceding the branch instruction (e.g., by instructions executed between the time the conditional branch instruction is fetched from the L2 cache 112 and the time that the conditional branch instruction is executed), the conditional branch instruction may be preresolved. By ensuring that preceding instructions do not modify the outcome of the conditional branch instruction (e.g., by ensuring that the preceding instructions do not change values in a condition register and thereby change the outcome of the branch instruction), the outcome of the branch instruction may be successfully determined by trial issuing the branch instruction (or a combination of instructions) out-of-order without executing the preceding instructions. The result of the conditional branch instruction may then be stored for later use.

In some cases, two or more instructions may be trial issued out-of-order without saving the instruction results in an effort to preresolve the outcome of a conditional branch instruction. By trial issuing the instructions out-of-order without saving the instruction results, the outcome of the conditional branch may be preresolved (e.g., before actual execution of the branch instruction) without the overhead typically associated with out-of-order execution (e.g., dependency checking). For example, in some cases, an add instruction or other arithmetic or logical instruction preceding the branch instruction may be executed which affects a bit in a condition register. Based on the affected bit, the conditional branch instruction may determine whether to take the branch (referred to as an add-branch combination). Where the add-branch combination can be preresolved (e.g., no other immediately preceding instructions need to be executed which affect the outcome of the branch instruction and add instruction), the add instruction and the branch instruction may be trial issued out-of-order and used to determine and store the outcome of the conditional branch instruction. After the trial issue of the add-branch combination, the preresolved outcome of the conditional branch instruction may be stored while the results of the add instruction (the sum) and the branch instruction (changing the program counter to the branch target address) may be discarded. Thus, the trial issue and execution may be analogous to prefetch before actual execution of the instructions.

In some cases, three or more instructions may be trial issued out of order in an effort to preresolve the outcome of a conditional branch instruction. For example, a load instruction may be used to load data into a register, and then the register contents may be compared to other data using a compare instruction. The outcome of the compare instruction may then affect a bit in a condition register which is used to determine whether to take the branch (referred to as a load-compare-branch combination). Where the load-compare-branch combination can be preresolved (e.g., no other immediately preceding instructions need to be executed which affect the outcome of the instructions), the instructions may be trial issued out-of-order and used to determine and store the outcome of the conditional branch instruction.

In one embodiment, a portion of an I-line containing the conditional branch instruction and other instructions may be selected and an out-of-order trial issue may be performed, thereby preresolving the conditional branch instruction. Where a portion of an I-line is selected and trial issued out of order, the I-line portion may contain the branch instruction, one or more preceding instructions, and one or more succeeding instructions. The outcome of the conditional branch instruction may be stored and used for scheduling and execution while the results of the other instructions may be discarded.

As described above, in some cases, a trial issue of the conditional branch instruction may be performed. Thus, in one embodiment of the invention, where a conditional branch instruction is preresolved by out-of-order execution of one or more instructions, the instructions which are executed out-of-order may be executed without storing any register values changed by the executed instructions. For example, where a branch instruction is preresolved, the program counter (normally affected by the branch instruction) may not be changed by the preresolved branch instruction even though the outcome of the conditional branch instruction (taken or not-taken) may be stored as described above. Similarly, where an add instruction, load instruction, compare instruction, and/or any other instruction are trial issued during preresolution, the results of such instructions may be discarded after the conditional branch instruction has been preresolved and the branch result (taken or not-taken) has been stored. Furthermore, the results described above may not be forwarded to other instructions which are not being preresolved (e.g., instructions being executed normally, e.g., in order). In some cases, a bit may be set in each of the instructions trial issued out-of-order during preresolution indicating that the results of the instructions should not affect any registers or other instructions and that the result of the branch (taken or not-taken) should be stored.

In one embodiment, a flag may be set in a branch instruction to identify that the instruction is preresolvable. The flag may be set, for example, during predecoding and scheduling of the conditional branch instruction (e.g., by the predecoder and scheduler circuitry 220). Such a flag may also be set for combinations of instructions or portions of I-lines as described above. Where the flag is set, the processor 110 may detect the flag, and, in response, the conditional branch instruction and any other instructions necessary for preresolution may be trial issued out-of-order for preresolution. In some cases, the flag may be set during a training mode (described below) and remain set during subsequent execution of the conditional branch instruction. Optionally, the flag may be set at compile time by a compiler and may be subsequently used to determine whether the instruction should be preresolved or not.

In one embodiment of the invention, where a cascaded, delayed execution processor unit (described above with respect to FIG. 3) is used to execute branch instructions, the instruction(s) which are being preresolved may be trial issued to the most delayed execution pipeline (e.g., pipeline P3 in FIG. 3). The preresolved instructions may be trial issued to the most delayed execution pipeline, for example, in cases where the most delayed execution pipeline is the execution pipeline which is least utilized.

In some cases, the preresolution may be performed on each branch instruction which is preresolvable. Optionally, in one embodiment of the invention, preresolution may be performed only where the conditional branch instruction is preresolvable and not predictable (e.g., not locally and/or globally predictable). For example, if the local predictability of a conditional branch instruction is below a threshold for predictability (e.g., as determined by the CNT value described above) and, where utilized, if the global predictability of a conditional branch instruction is below a threshold for predictability, and if the conditional branch instruction is preresolvable, then the conditional branch instruction may be preresolved as described herein. Optionally, any scheme for determining the predictability of a conditional branch instruction known to those skilled in the art may be used to determine whether a conditional branch instruction is predictable.

In one embodiment of the invention, the determination of whether a conditional branch instruction may be preresolved may be made as the instruction is fetched from the L2 cache 112. For example, as an I-line is fetched from the L2 cache 112, the predecoder and scheduler circuitry 220 may be used to determine if the fetched I-line contains a conditional branch instruction which should be preresolved. Where the I-line contains a conditional branch instruction which should be preresolved, the predecoder and scheduler 220 may trial issue the conditional branch instruction and any other instructions necessary for preresolution out-of-order to the processor core 114, e.g., before other instructions located in the I-cache 222.

In one embodiment of the invention, a conditional branch instruction may be preresolved after an I-line containing the conditional branch instruction is prefetched from the L2 cache 112. I-line prefetching may occur, for example, when the processor 110 determines that an I-line being fetched contains an "exit branch instruction" that branches to (targets) an instruction that lies outside the I-line. The target address of the exit branch instruction may be extracted (e.g., by calculating the target address or using a previously stored target address) and used to prefetch the I-line containing the targeted instruction, from the L2 cache 112, higher levels of cache, and/or memory. Such prefetching may occur, e.g., before the exit branch instruction targeting the instruction in the I-line has been executed and/or before a program counter for the processor 110 is changed to target the instruction in the I-line. For example, branch prediction information may be used to predict the outcome of the exit branch instruction. As a result, if/when the exit branch is taken, the targeted I-line may already be in the I-cache 222, thereby avoiding a costly miss in the I-cache 222 and improving overall performance.

Examples of such I-line prefetching are described in the co-pending application entitled "SELF PREFETCHING L2 CACHE MECHANISM FOR INSTRUCTION LINES", U.S. application Ser. No. 11,347,412, filed Feb. 3, 2006.

After an I-line targeted by an exit branch instruction has been prefetched, a determination may be made, as described above, of whether the prefetched I-line contains a conditional branch instruction which should be preresolved. By preresolving a conditional branch instruction contained in the prefetched I-line, an early determination of the outcome of the conditional branch instruction may be made, thereby allowing the processor 110 to better schedule execution of instructions. Furthermore, in some cases, once the outcome of the branch instruction in the prefetched I-line has been preresolved, the target address of the preresolved branch instruction may be used to prefetch additional I-lines, if necessary.

In one embodiment, where a conditional branch instruction is prefetched from a cache, the conditional branch instruction may only be preresolved where the prefetch (and/or other preceding prefetches, where chains of I-lines are prefetched) was performed based on a predictable conditional branch instruction (or a preresolved conditional branch instruction) in another I-line. Optionally, in some cases, the conditional branch instruction may only be preresolved if the preceding prefetches were performed based on no more than one or two unpredictable conditional branch instructions (e.g., a prefetch based on an unpredictable branch instruction followed by a prefetch based on another unpredictable branch instruction). By limiting the number of preceding prefetches based on unpredictable conditional branch instructions, the resources necessary to perform preresolution may be conserved in cases where the instructions in the prefetched I-line may not be ultimately executed (e.g., due to an incorrect prefetch based on an unpredictable branch instruction which is ultimately resolved with an outcome opposite the prediction).

Figure 9:
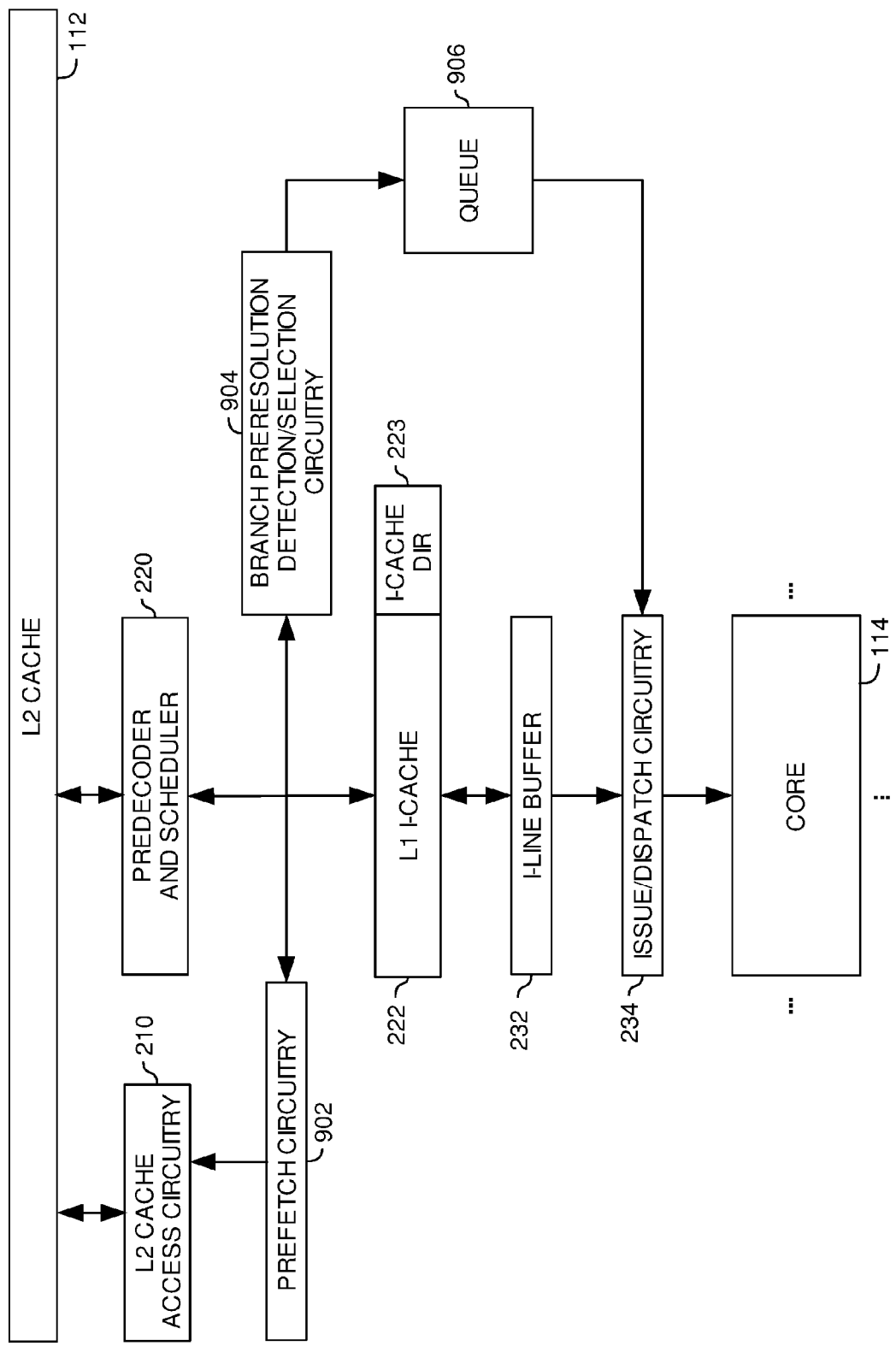
FIG. 9 is a block diagram depicting exemplary circuitry for preresolving a conditional branch instruction fetched from an L2 cache according to one embodiment of the invention.

FIG. 9 is a block diagram depicting exemplary circuitry for preresolving a conditional branch instruction fetched (or prefetched) from an L2 cache 112 according to one embodiment of the invention. As depicted, prefetch circuitry 902 may be used to perform prefetches of I-lines, e.g., based on one or more addresses stored in I-lines being fetched from the L2 cache 112 and relayed to the I-cache 222 via the predecoder and scheduler 220. Also, as depicted, branch preresolution detection and selection circuitry 904 may be provided for detecting preresolvable branches and preresolvable branch instruction combinations and selecting the instructions from I-lines being fetched or prefetched from the L2 cache 112.

In one embodiment, the instructions to be preresolved may be placed in a queue 906. The issue and dispatch circuitry 234 may be used to determine whether to issue instructions from the I-line buffer 232 or queue 906. In some cases, the conditional branch instruction or branch instruction combination may be executed during free cycles (e.g., unused processor cycles) of the processor core 114. For example, in one embodiment, instructions in the I-line buffer 232 may be given priority during execution. If the instructions being executed from the I-line buffer 232 result in a stall (e.g., due to a cache miss), then the issue/dispatch circuitry 234 may trial issue instructions from the queue 906, thereby utilizing the processor core 114 to perform preresolution without interrupting execution of other instructions in the processor core 114. Optionally, in one embodiment, instructions may be trial issued from the queue 906 after the instructions have been in the queue for a threshold amount of time, or after a threshold number of instructions from the I-line buffer 232 have been executed (e.g., a first number of scheduled instructions may be executed for every conditional branch instruction or branch instruction combination trial issued out-of-order).

Other embodiments for trial issuing the branch instructions/combinations in the queue 906 should be readily apparent to those of ordinary skill in the art. For example, an advance execution instruction tag may be placed in the instruction or stored with the instruction in the queue 906 and when the program counter is almost equal to the advance execution instruction tag (e.g., when the program counter is a threshold number of instructions away from the advance execution instruction tag, such as when the program counter is one cache line away from executing the instruction), the tagged instructions may be popped from the queue 906 and trial issued. For example, the advance execution instruction tag may only provide higher order bits of the preresolve instructions to be trial issued. The higher order bits of the advance execution instruction tag may, for example, identify an instruction line, a group of two instruction lines, or a group of four instruction lines, etc. containing the instructions to be trial issued. When the program counter falls within or near the identified instruction lines, the tagged instructions may be trial issued and the preresolution results may be stored for subsequent use in execution of the conditional branch instruction as described above.

Thus, where prefetched instructions are placed in the queue 906, only instructions likely to be executed (e.g., preresolution instructions with an advance execution instruction tag almost equal to the program counter and which may not have a preceding branch instruction which may branch around the preresolution instructions) may actually be retrieved from the queue 906 and executed. Optionally, the queue 906 may have a fixed delay through which instructions in the queue pass. After the instructions have been in the queue 906 for the length of the fixed delay, the instructions may be trial executed.

In one embodiment of the invention, the preresolved outcome of a conditional branch instruction may be used to perform a subsequent prefetch of an I-line. For example, if a conditional branch instruction branches to a target instruction in another I-line when the branch is taken, then the other I-line may be prefetched if the preresolved outcome of the branch instruction indicates that the branch will be taken. If the preresolved outcome indicates that the branch is not taken, the prefetch may be used for the target of another branch instruction or for another, succeeding I-line.

In one embodiment of the invention, a conditional branch instruction or conditional branch instruction combination fetched or prefetched from the I-cache 222 may be preresolved. For example, a first I-line fetched from the I-cache 222 (e.g., in response to a demand/request from the processor core 114) may contain one or more target effective addresses (or one or more portions of effective addresses, e.g., the portion may be only enough bits of an address to identify an I-line in the I-cache 222). The target effective addresses may correspond, for example, to subsequent I-lines containing instructions which may be executed after the instructions in the first fetched I-line. In some cases, the target addresses corresponding to the sequence of I-lines to be fetched may be generated and placed in the I-line during predecoding and scheduling (e.g., by the predecoder and scheduler 220). Optionally, the target address for an exit branch instruction in the first I-line may be used, as described below.

In one embodiment, the one or more target effective addresses may be used to prefetch the subsequent I-lines from the I-cache 222. For example, the first I-line may contain portions of two effective addresses identifying two I-lines, each of which may be prefetched. In some cases, if a determination is made that an I-line to be prefetched is not in the I-cache 222, the I-line may be fetched from the L2 cache 112. Also, for each prefetched I-line, target addresses within the prefetched I-line may be used for subsequent prefetches (e.g., to perform a chain of prefetches).

Each I-line which is prefetched from the L1 cache 222 using the effective addresses may be placed in one or more buffers. For each I-line, a determination may be made of whether the I-line contains a preresolvable conditional branch instruction or conditional branch instruction combination. If the I-line does contain a preresolvable conditional branch instruction or conditional branch instruction combination may be trial issued out-of-order and preresolved as described above.

Figure 10:
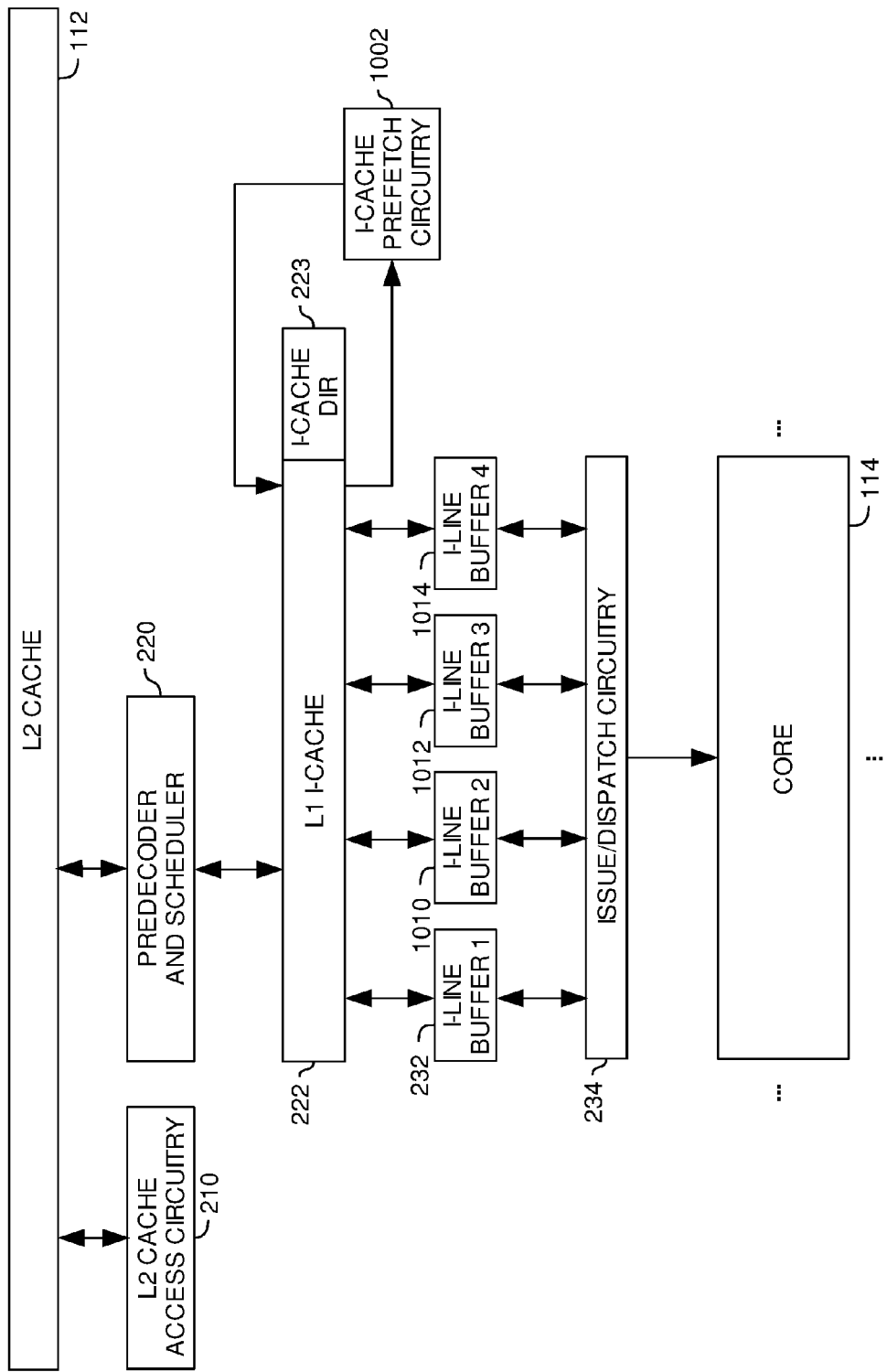
FIG. 10 is a block diagram depicting exemplary circuitry for preresolving conditional branch instructions fetched from an I-cache according to one embodiment of the invention.

FIG. 10 is a block diagram depicting exemplary circuitry for preresolving conditional branch instructions fetched (or prefetched) from the I-cache 222 according to one embodiment of the invention. As depicted, I-cache prefetch circuitry 1002 may be used to detect target addresses in I-lines being fetched or prefetched from the I-cache 222 and issue requests for I-lines corresponding to the target addresses. The prefetched I-lines may then be placed in one of four I-line buffers 232, 1010, 1012, 1014. For example, the first I-line buffer 232 may be used to execute instructions in program order (e.g., for the current portion of a program being executed) while the other I-line buffers 1010, 1012, 1014 may be used for out-of-order execution of conditional branch instructions/instruction combinations. The other I-line buffers 1010, 1012, 1014 may also be used for other purposes, such as buffering non-predicted or non-preresolved branch paths, or for simultaneous multithreading, described below).

Once the conditional branch instructions/instruction combinations from the prefetched I-lines are placed in the I-line buffers 1010, 1012, 1014, the conditional branch instructions/instruction combinations may be trial issued out-of-order for preresolution as described above. In some cases, as described above with respect to instructions trial issued out-of-order from the L2 cache 112 (e.g., via queue 906 in FIG. 9), the conditional branch instructions/instruction combinations from the other buffers 1010, 1012, 1014 may only be trial issued and executed out-of-order during free cycles in the processor core 114.

While described above with respect to preresolving instructions fetched from an I-cache 222 or an L2 cache 112, preresolution may be performed at some other time, e.g., after the conditional branch instructions are fetched from an L3 cache.

As described above, the outcome of a preresolved conditional branch instruction (e.g., taken or not-taken) may be stored and used later to determine the scheduling of subsequent instructions (e.g., allowing subsequent instructions to be correctly issued to the processor core 114 and/or prefetched). In one embodiment of the invention, the result of the conditional branch instruction may be stored as a bit which is accessed using a content addressable memory (CAM). If the preresolution of the conditional branch instruction indicates that the conditional branch instruction will be taken, then the stored bit may be set. Otherwise, if the preresolution indicates that the conditional branch instruction will not be taken, the stored bit may be cleared.

Figure 11:
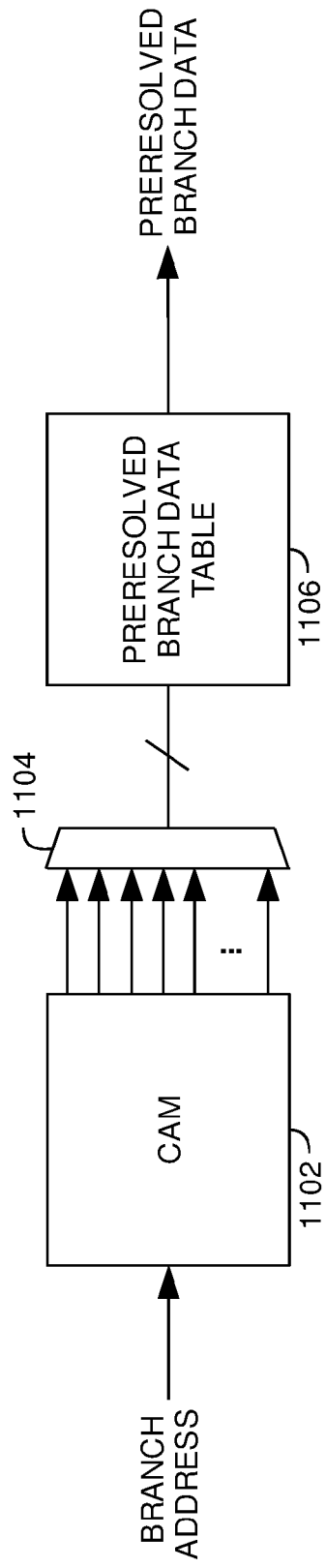
FIG. 11 is a block diagram depicting an exemplary CAM for storing preresolved conditional branch information according to one embodiment of the invention.

FIG. 11 is a block diagram depicting an exemplary CAM for storing preresolved conditional branch information according to one embodiment of the invention. When an address is applied to the CAM 1102, an output of the CAM 1102 may indicate whether an entry corresponding to the address is present in the CAM 1102 and identify the entry. The entry identification may then be used by selection circuitry 1104 to obtain data associated with the entry/address, for example, from a table 1106 of corresponding preresolved branch data (e.g., a RAM array). Thus, the address of a branch instruction may be used as an index into the CAM 1102 to obtain the stored outcome of a preresolved branch instruction, if any. In some cases, only a portion of the conditional branch instruction address may be used to store the outcome of the conditional branch instruction. During execution, the CAM 1102 may be checked to determine whether the outcome of the branch instruction has been preresolved, and if so, schedule execution of the branch instruction and subsequent instructions accordingly. Furthermore, as described above, in some cases, only conditional branch instructions which are preresolvable and not predictable may be preresolved. Because not every conditional branch instruction may be preresolved, the size of the memory (e.g., CAM 1102 and/or table 1106) necessary to store the conditional branch instruction results may be reduced accordingly.

In one embodiment of the invention, the CAM 1102 and preresolved branch data table 1106 may be used to store condition registers bits (e.g., instead of or in addition to the outcome of the conditional branch instruction and/or other information) for one or more conditional branch instructions. When a conditional branch instruction is being scheduled for execution, the bits of the condition register entry corresponding to the conditional branch instruction may be checked to determine whether the branch will be taken or not taken.

For example, one type of conditional branch instruction may be taken if the condition register indicates that a value processed by the processor 110 is zero (branch if zero, or BRZ). When a BRZ instruction and subsequent instructions are being scheduled for execution, the processor 110 may check the CAM 1102 and table 1106 to determine if an condition register entry corresponding to the BRZ instruction is in the table 1106. If such an entry is located, the zero bit (Z-bit) in the condition register entry may be examined to determine whether the conditional branch instruction will be taken (if the Z-bit is set) or not-taken (if the Z-bit is cleared).

In one embodiment of the invention, multiple conditional branch instructions may utilize a single condition register entry in the preresolved branch data table 1106. Each instruction may check the condition register entry to determine whether the branch instruction will be taken or not-taken. For example, one conditional branch instruction may check the Z-bit for the condition register entry to determine if the outcome of a previous calculation was zero. Another conditional branch may check an overflow bit which indicates whether the outcome of the previous calculation resulted in an overflow (e.g., the calculation resulted in a value which was too large to be held by the counter used to store the value). Thus, in some cases, by storing condition register entries which may each be used for multiple branch instructions, the size of the preresolved branch data table 1106 may be reduced.

In some cases, both targets of a conditional branch instruction may be prefetched and/or buffered even if the conditional branch instruction is preresolved. For example, in some cases, the conditional branch instruction may be preresolved without determining whether the preresolution is completely accurate (e.g., without determining whether instructions preceding the conditional branch instruction in program order will modify the preresolved outcome when executed). In such cases, the preresolution of the conditional branch instruction may be a "best guess" which path of the conditional branch instruction will be followed. In one embodiment, by buffering both paths (preresolved and non-preresolved) of the conditional branch instruction while issuing only the preresolved path, the processor 110 may recover quickly by issuing the buffered, non-preresolved path if execution of the conditional branch instruction indicates that the preresolved path was not followed by the instruction.

In some cases, a conditional branch instruction may not be preresolvable, e.g., because the conditional branch instruction is dependent on a condition which cannot be resolved at the time the conditional branch instruction is retrieved from the L2 cache 112. Where preresolution is not used for a conditional branch instruction, other techniques may be used to schedule execution of instructions after the branch instruction.

For example, in one embodiment of the invention, the CAM 1102 may be checked to determine if an entry corresponding to the conditional branch instruction is present. If the CAM 1102 indicates that a corresponding entry for the conditional branch instruction is present, then the corresponding entry may be used for scheduling and execution of the conditional branch instruction and/or subsequent instructions. If the CAM 1102 indicates that a corresponding entry for the conditional branch instruction is not present, then another method may be used for scheduling and execution of the conditional branch instruction and/or subsequent instructions. For example, branch prediction information (described above) may be utilized to predict the outcome of conditional branch instructions which are not preresolvable. Optionally, as described below, predicated issue or dual-path issue may be utilized to execute conditional branch instructions which are not preresolvable. Optionally, any other conditional branch resolution mechanisms, known to those skilled in the art, may be used to schedule instructions which follow a conditional branch instruction.

Dual Path Issue for Conditional Branch Instructions

In one embodiment of the invention, the processor 110 may be used to execute multiple paths of a conditional branch instruction (e.g., taken and not-taken) simultaneously. For example, when the processor 110 detects a conditional branch instruction, the processor 110 may issue instructions from both the branch taken path and instructions from the branch not-taken path of the conditional branch instruction. The conditional branch instruction may be executed and a determination may be made (e.g., after both branch paths have been issued) of whether the conditional branch instruction is taken or not-taken. If the conditional branch instruction is taken, results of the instructions from the branch not-taken path may be discarded. If the branch is not-taken, results of the instructions from the branch taken path may be discarded.

Figure 12:
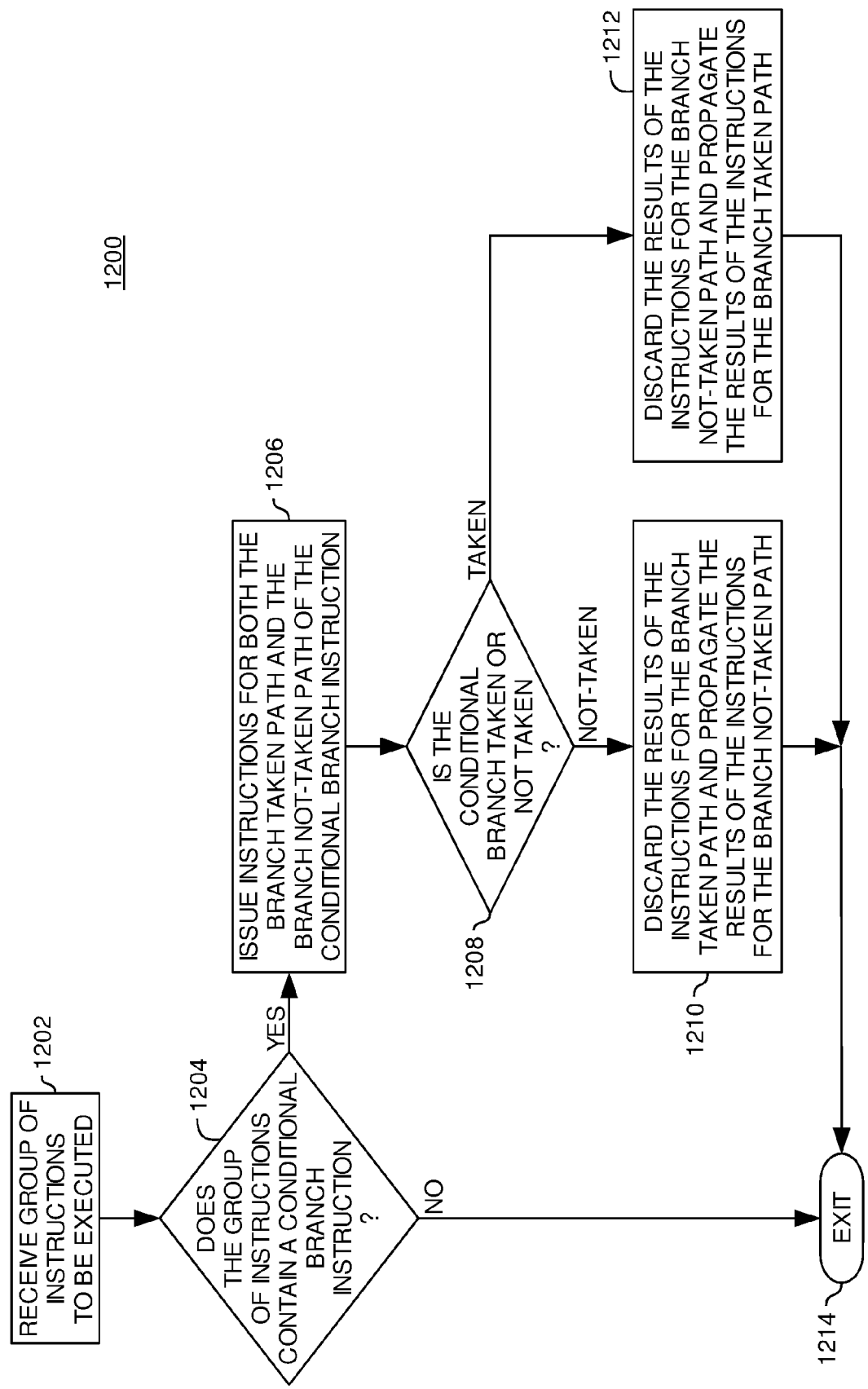
FIG. 12 is a flow diagram depicting a process for executing multiple paths of a conditional branch instruction according to one embodiment of the invention.

FIG. 12 is a flow diagram depicting a process 1200 for executing multiple paths of a conditional branch instruction according to one embodiment of the invention. As depicted, the process 1200 may begin at step 1202 where a group of instructions to be executed is received. At step 1204, a determination may be made of whether the group of instructions contains a conditional branch instruction. If the group of instructions contains a conditional branch instruction, then at step 1206 the processor 110 may issue instructions from the branch taken path and the branch not-taken path of the conditional branch instruction. At step 1208, a determination may be made of whether the conditional branch instruction is taken or not-taken. If the conditional branch instruction is not-taken, then at step 1210 the results of the instructions from the branch taken path may be discarded while the results of the instructions from the branch not-taken path may be propagated. If, however, the conditional branch instruction is taken, then at step 1212 the results of the instructions from the branch not-taken path may be discarded while the results of the instructions from the branch taken path may be propagated. The process may then finish at step 1214.

In one embodiment of the invention, dual path issue may only be utilized where the conditional branch instruction is unpredictable (or, optionally, where the conditional branch instruction is not fully predictable) e.g., using local branch prediction and/or global branch prediction. For example, where local branch prediction is utilized, if a conditional branch instruction is locally predictable (e.g., if CNT is greater than or equal to a threshold for predictability), dual path issue may not be utilized. If a conditional branch is locally unpredictable, then dual path issue (or, optionally, another method such as preresolution or predicated issue) may be utilized. Where both local branch prediction and global branch prediction are utilized, if a conditional branch instruction is either locally predictable or globally predictable, then dual path issue may not be utilized. However, if a conditional branch instruction is neither locally nor globally predictable, then dual path issue (or, optionally, another method) may be utilized to execute the conditional branch instruction. Furthermore, in some cases, where branch preresolution is utilized, dual path issue may be utilized only where the conditional branch instruction is neither predictable nor preresolvable.

In some cases, whether dual path issue is performed may depend on whether two threads are being executed simultaneously in the processor core 114. For example, if only one thread is executing in the processor core 114, then dual path issue may be performed where an unpredictable conditional branch instruction is detected or where a branch which is only partially predictable is detected.

In some cases, whether dual path issued is performed may depend on both the predictability of the conditional branch instruction and whether two threads are being executed. For example, where a conditional branch instruction is being executed and an unpredictable conditional branch instruction is detected, then dual path issue may be utilized, even if another thread is quiesced while the dual path issue is performed. If, however, a partially predictable conditional branch instruction is detected, then dual path issue may only be utilized in cases where the other thread is already quiesced or not being executed. Such determination of dual path issue may also depend upon priorities associated with each thread. For example, in some cases, dual path issue may be performed using any of the conditions described above, but only where the priority of the thread subject to dual path issue is greater than the priority of the other thread being executed.

In one embodiment of the invention, detection of the conditional branch instruction and initiation of the dual path issue may be performed by the predecoder and scheduler circuitry 220 as instruction lines are fetched (or prefetched) from the L2 cache 112 and sent to the I-cache 222. In some cases, the predecoder and scheduler 220 may determine whether a given group of instructions contains a conditional branch instruction. The predecoder and scheduler 220 may be used to determine whether the conditional branch instruction is locally and/or globally predictable. Furthermore, the predecoder and scheduler 220 may be used to fetch, prefetch, and/or buffer instructions and I-lines for each path of the conditional branch instruction.

In one embodiment, where the predecoder and scheduler 220 determines that a conditional branch instruction may be executed with dual path issue, the predecoder and scheduler 220 may store a bit indicating that dual path issue may be utilized for the instruction (in some cases, e.g., after determining that the instruction is not preresolvable and not predictable). The bit may, for example, be encoded in the instruction or otherwise stored in a manner associating the bit with the conditional branch instruction. In some cases, to reduce the power consumption used to determine whether dual path issue is appropriate, the bit may be calculated and stored only during a training phase, described below. When the bit is subsequently detected, dual path issue may be utilized to execute the conditional branch instruction.

In one embodiment of the invention, the processor core 114 may utilize simultaneous multithreading (SMT) capabilities to execute each path for the conditional branch instruction. Typically, simultaneous multithreading may be used to issue and execute a first and second thread in a processor 110. Where utilized for dual path execution of a conditional branch instruction, one path of the conditional branch instruction may be issued as a first thread to the processor 110, and another path of the conditional branch instruction may be issued as a second thread to the processor 110. After the outcome of the conditional branch instruction is determined, the outcome (taken or not-taken) may be utilized to continue execution of one of the paths/threads and discard the results of the other path/thread. For example, if the conditional branch is taken, the branch taken thread may continue execution while the branch not-taken thread (and results) may be discarded. Similarly, if the conditional branch is not-taken, the branch not-taken thread may continue execution while the branch taken thread (and results) may be discarded.

FIG. 13 is a block diagram depicting circuitry utilized for dual path issue of a conditional branch instruction according to one embodiment of the invention. As depicted, in some cases two I-line buffers 1332, 1336 may be provided, one for each thread. Similarly, two sets of issue/dispatch circuitry 1334, 1338 may also be provided, one for each thread. Merge circuitry 1302 may also be provided to merge instructions from one thread with the other thread and form combined issue groups. In some cases, a single issue group may contain instructions from both threads. Each thread may also be provided with a separate set of registers 1340, 1342 in the register file 240. Branch path selection circuitry 1304 may be utilized to determine whether the conditional branch instruction for each of the threads is taken or not-taken and propagate either thread's results or discard either thread's results as appropriate.

FIG. 14 is a block diagram depicting an exemplary instruction 1402 executed using simultaneous multithreading according to one embodiment of the invention. As depicted, the instruction may include an op-code, one or more register operands (Reg. 1, Reg. 2), and/or data. For each instruction and/or register operand, one or more bits (T) may be provided which indicate the set of thread registers 1340, 1342 to use for the instruction. Thus, for example, an instruction in thread 0 and an instruction in thread 1 may both utilize the same register (e.g., Reg. 1), but the instruction in thread 0 will use register 1 in the thread 0 registers 1340 whereas the instruction in thread 1 will use register 1 in the thread 1 registers 1342, thereby avoiding conflict between the instructions.

In one embodiment of the invention, thread validity bits (T0V, T1V) may be used by the processor 110 to determine whether a given branch path is valid or invalid. For example, each instruction or group of instructions for each path of the conditional branch instruction may be issued with both bits set, indicating that both threads are valid. After the outcome of the branch instruction is determined, the bits for the branch path which is followed (e.g., taken or not taken) may remain set while the bits for the branch path which is not followed may be cleared. Where the thread validity bits for an instruction in that thread are set, the results of the instruction may be propagated and/or stored e.g., via forwarding, or write-back to the D-cache 224 or register file 240. Where the thread validity bits for an instruction in that thread are cleared, the results of the instruction may be discarded and not propagated by the processor 110. Accordingly, the thread bits T0V, T1V may be used select and continue execution of the thread for the branch path which is followed.

In one embodiment of the invention, the thread bits T and/or the thread validity bits T0V, T1V may be stored (e.g., encoded) into each instruction 1102. Optionally, the thread bits T and/or the thread validity bits T0V, T1V may be stored outside of the instruction 1402, e.g., in a group of latches which holds the instruction 1402 as well as the bits.

In one embodiment of the invention, a predicted path for a dual-issued conditional branch instruction may be favored when issuing instructions for each path to the processor pipeline. In some cases, such prediction may be utilized (e.g., as a "best" guess) even if a conditional branch instruction is locally and/or globally unpredictable.

As an example of favoring the predicted path over the non-predicted path, a fixed ratio of instructions for the predicted path to instructions for the non-predicted path may be issued. For example, where four instructions are placed in an issue group, the ratio may be three instructions from the predicted path to one instruction from the non-predicted path. Where six instructions are placed in an issue group, the ratio may be four for the predicted branch to two for the non-predicted branch. Where eight instructions are placed in an issue group, the ratio may be six for the predicted path to two for the non-predicted path (also a ratio of three to one).

As another example of favoring the predicted path over the non-predicted path, the ratio of instructions for the predicted path to instructions for the non-predicted path may vary based upon the level of predictability of the conditional branch instruction. If the predictability of the conditional branch instruction is within a first range, then a first ratio of instructions may be issued. For example, if the conditional branch instruction is moderately unpredictable, a large ratio of instructions, e.g., three to one, may be issued. If the predictability of the conditional branch instruction is within a second range, then a second ratio of instructions may be issued. For example, if the conditional branch instruction is fully unpredictable, an even ratio of instructions, e.g., one to one, may be issued.

In some cases, dual issue for predicated branch instructions may only be utilized where another thread being executed by the processor 110 is stalled. For example, if the processor 110 is executing a first thread and a second thread, and the first thread contains a conditional branch instruction, then the processor 110 may utilize dual path issue for the first thread where the second thread is stalled, e.g., due to a cache miss. In some cases, other conditions, described above, may also be applied. For example, dual path issue may be utilized where both the second thread is stalled and where the conditional branch instruction is locally and/or globally unpredictable.

In some cases, where dual path issue utilizes SMT circuitry, if one path of the dual path issue stalls, the other path of the dual path issue may be the only thread issued until the stalled thread resumes execution (e.g., if a first thread stalls due to a cache miss, the second thread may be issued alone until the necessary data is retrieved, e.g., from the L2 cache 112) or until the outcome of the conditional branch instruction is resolved and one of the threads is discarded. In some cases, issuing one thread where the other thread is stalled may be performed even where the stalled thread is a predicted and preferred path of the conditional branch instruction as described above.

In one embodiment of the invention, the I-line buffer 232 and/or delay queues 320 may contain instructions from both paths of a conditional branch instruction. Because the I-line buffer 232 and delay queues 320 are storage circuits and may not contain processing circuitry, storing, buffering, and queuing both paths of the conditional branch instruction may be performed with relatively little processing overhead. After the outcome of the conditional branch instruction is resolved, the instructions for the branch path which is not followed may then be marked as invalid (e.g., by changing a thread validity bit T0V, T1V) and discarded from the I-line buffer 232 and/or delay queues 230 when appropriate.

In some cases, dual path issue may be restricted where two instructions are competing for a limited processing resource. For example, if both paths contain one or more instructions which require a given pipeline for execution (e.g., pipeline P0), dual path issue of the branch paths may be restricted. In one embodiment of the invention, where dual path issue for paths of the conditional branch instruction is restricted because of insufficient processing resources, the predicted path of the conditional branch instruction may be issued and executed with the limited resource.

Also, issuing only one path of the conditional branch may be limited, e.g., due to resource restrictions/conflicts in the processor 110, the processor 110 may issue both paths of the conditional branch instruction such that the resource is shared by both paths. For example, a first branch path may be stalled while a second branch path utilizes the resource. Then, after the second branch is finished utilizing the resource, the first branch path may resume execution and utilize the resource. Optionally, scheduling of instructions for the branch paths may be arranged such that the resource conflict does not occur. For example, such scheduling may include issuing instructions in order for a first branch path which utilizes the resource while issuing instructions out-of-order for a second branch path. After the first branch path has finished utilizing the resource, instructions from the second branch path which utilize the resource may then be issued.

In one embodiment of the invention, dual issue of conditional branch instructions may be limited to branches for which the branch distance is below a threshold distance. For example, in some cases the processor 110 may only utilize a lower portion of addresses for addressing instructions in the processor core 114 (e.g., each instruction may be addressed using a base address plus the lower portion as an offset from the base address). Such partial addressing may be utilized, for example, because reduced processor resources may be utilized when storing and calculating partial addresses.

In one embodiment, where a lower offset portion of each instruction address is used to address that instruction in the processor core 114, dual path issue may only be utilized where the branch distance is less than the offset provided by the address portion. In such cases, by restricting the branch distance for dual path issue, both paths may then efficiently utilize the same base address used by the processor core 114 for addressing instructions. Also, in one embodiment, as described below, a lower distance threshold may also be placed on branch distance e.g., wherein the conditional branch instruction is executed using predicated issue if the branch distance is less than a threshold distance for efficient dual issue of the conditional branch instruction.

In some cases, where only one path of the conditional branch instruction is issued, the other path of the conditional branch instruction may also be buffered, e.g., by fetching instructions for the branch path which is not issued and placing those instructions in the I-cache 222 and/or I-line buffer 232. If the outcome of the conditional branch instruction indicates that the issued path of was not followed, the buffered instructions from the path which is not issued may be quickly issued and executed by the processor 110, thereby reducing the latency necessary to switch from the branch path which was issued but not followed to the branch path which was not issued but followed. By buffering both paths of the conditional branch instruction and issuing only the predicted path, the processor 110 may quickly begin execution of the non-predicted path if the outcome of the conditional branch instruction indicates that the non-predicted path should be followed.

In one embodiment, both branch paths may be buffered but only one branch path may be issued where the predictability of a branch instruction indicates that the branch is below a threshold for being fully predictable but greater than or equal to a threshold for being partially predictable. In such cases, the predicted path for the partially predicted conditional branch instruction may be both buffered and issued for execution by the processor 110. The non-predicted path may also be buffered but not issued. If the outcome of the conditional branch instruction indicates that the predicted and issued path was followed by the branch instruction, then the predicted and issued path may continue execution. If the outcome of the conditional branch instruction indicates that the predicted path was not followed, then the buffered and non-issued path may be issued and executed.

In some cases, dual path issue may only be used where predicated issue of conditional branch instructions (described below) would be inefficient, (e.g., due to the number of interceding instructions) or where predicated issue is not possible (e.g., due to instruction interdependencies).

Predicated Execution for Short, Conditional Branch Instructions

In some cases, a conditional branch instruction may jump over one or more interceding instruction located between the conditional branch instruction and the target of the conditional branch instruction if the branch is taken. If the conditional branch instruction is not taken, the interceding instructions may be executed. Such branch instructions may be referred to as short, conditional branches.

In one embodiment of the invention, the interceding instructions between a short, conditional branch instruction and the target of the short, conditional branch instruction may be issued and executed by the processor 110 e.g., before the outcome of the conditional branch instruction is known. When the conditional branch instruction is executed, a determination may be made of whether the branch is taken. If the branch is taken, the results of the issued, interceding instructions may be discarded. If the branch is not taken, the results of the issued, interceding instructions may be stored. The technique of issuing the interceding instructions for a short, conditional branch instruction may be referred to as "predicated issue", because use and/or storage of the results of the interceding instructions may be predicated on the outcome of the conditional branch instruction (e.g., not-taken). By using predicated issue, the processor 110 may effectively execute both paths of the conditional branch instruction as a single path (e.g., using a single thread and not interfering with a second active thread) and determine afterwards whether to use the results of the interceding instructions which would be jumped by the conditional branch instruction if the branch is taken, thereby executing the conditional branch instruction without an inefficient stall or flush of instructions in the processor core 114. As described below, if the processor determines that the results of the interceding instructions should not be used, the results may be discarded, for example, by clearing a bit (e.g., a validity bit) to indicate that the results of the interceding instructions are invalid.

Figure 15:
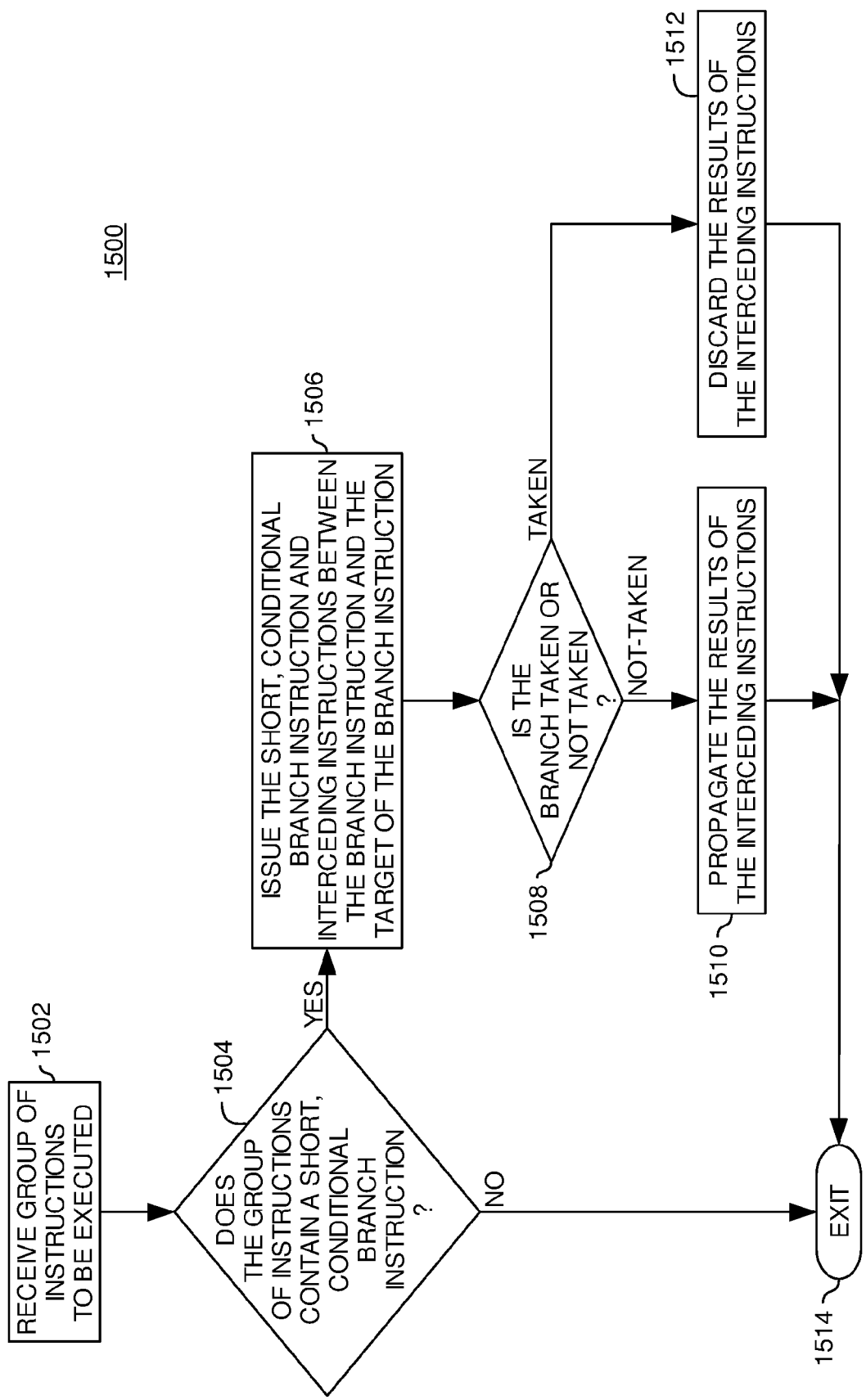
FIG. 15 is a flow diagram depicting a process for executing short conditional branches according to one embodiment of the invention.

FIG. 15 is a flow diagram depicting a process 1500 for executing short conditional branches according to one embodiment of the invention. As depicted, the process 1500 may begin at step 1502 where a group of instructions to be executed is received. At step 1504, a determination is made of whether the group of instructions contains a short, conditional branch instruction. If the group of instructions contains a short, conditional branch instruction, then the short, conditional branch instruction and the interceding instructions between the short, conditional branch instruction and the target of the short, conditional branch instruction may be issued, e.g., to the processor core 114 at step 1506. At step 1508, a determination may be made of whether the outcome of the conditional branch instruction indicates that the conditional branch is taken or not-taken. If the branch is not-taken, then the results of the interceding instructions may be stored and propagated in the processor 110 at step 1510. If the branch is taken, then the results of the interceding instructions may be discarded at step 1512. The process 1200 may finish at step 1514.

Figure 16A:
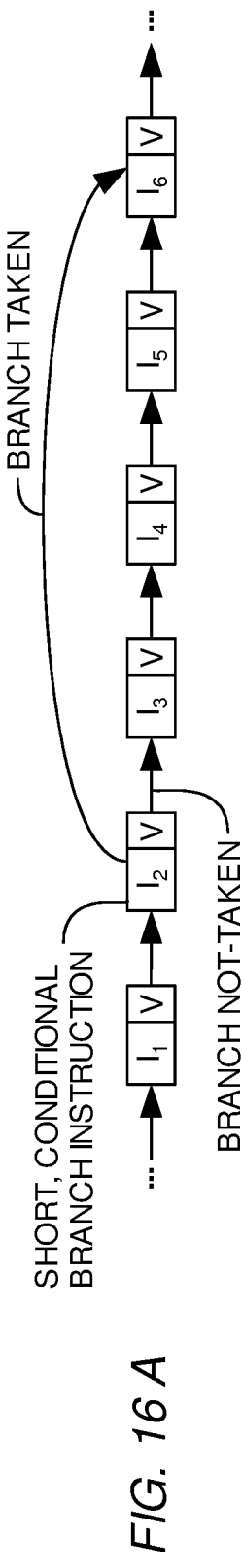
FIGS. 16A-C are block diagrams depicting a short conditional branch instruction according to one embodiment of the invention.
Figure 16B:
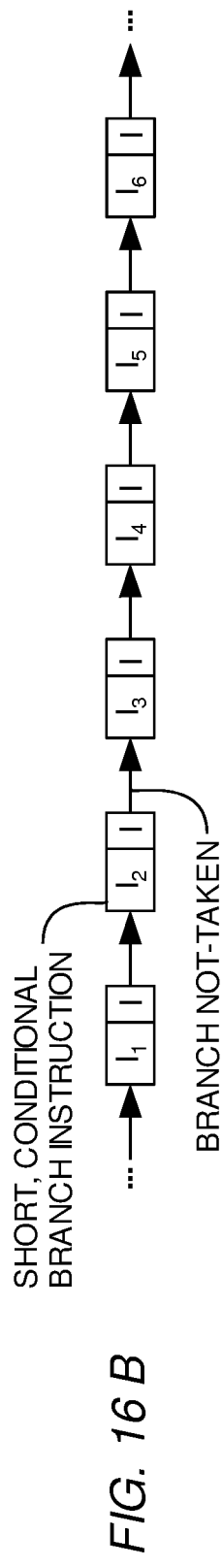
Figure 16C:
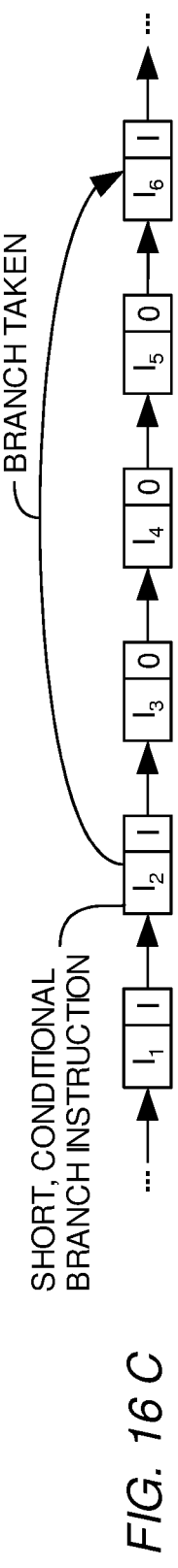

FIGS. 16A-C are block diagrams depicting a short conditional branch instruction ($I_2$) according to one embodiment of the invention. As depicted in FIG. 16A, if the conditional branch instruction $I_2$ is taken, the instruction may branch over several interceding instructions ($I_3$, $I_4$, $I_5$) to a target instruction ($I_6$). If, however, the conditional branch instruction is not-taken, the interceding instructions ($I_3$, $I_4$, $I_5$) may be executed before subsequent instructions (e.g., instruction $I_6$) are executed.

As described above, when the short, conditional branch instruction $I_2$ is detected (e.g., by the predecoder and scheduler 220), the conditional branch instruction $I_2$ and the interceding instructions $I_3$-$I_5$ may be issued to the processor core 114, e.g., regardless of whether the branch is taken or not-taken. In one embodiment of the invention, each instruction may contain a validity bit (V) which indicates whether the results of an instruction are valid. For example, if the bit is set for a given instruction, the instruction may be valid and the results of the instruction may be propagated to memory, registers, and other instructions. If the bit is not set for a given instruction, the instruction may be invalid and the results of the instruction may be discarded and not propagated.

Thus, in one embodiment of the invention, each instruction may be issued with a set validity bit, thereby indicating that the instruction is presumed to be valid. After the conditional branch instruction is executed, if a determination is made that the branch is not taken (e.g., as shown in FIG. 13B), then the validity bit may remain set for each of the interceding instructions $I_3$-$I_5$, indicating that the interceding instructions are valid and that the results of the interceding instructions may be propagated. Optionally, if a determination is made that the branch is taken (e.g., as shown in FIG. 16C), the validity bit may be cleared for each of the interceding instructions $I_3$-$I_5$, thereby indicating that the results of the instructions should be discarded.

For example, the validity bit may be examined by forwarding circuitry, the write-back circuitry 238, cache load and store circuitry 250, and/or other circuitry in the processor 110 to determine whether to propagate the results of the interceding instructions. If the validity bit is set, the results may be propagated (e.g., the write-back circuitry 238 may write-back the results of the interceding instructions), and if the validity bit is cleared, then the results may be discarded (e.g., the write-back circuitry 238 may discard the results of the interceding instructions). In one embodiment of the invention, every instruction may have a validity bit. Optionally, in one embodiment, the validity bit may only be maintained and/or modified for the interceding instructions ($I_{3-5}$) between the conditional branch instruction and the target instruction.

In one embodiment, predicated issue for short, conditional branch instructions may only be used where the cost and/or efficiency (e.g., in cycles of processor time) for predicated issue is less than the cost and/or efficiency for dual issue. If the number of interceding instructions is below a threshold number of instructions for efficient dual issue, then predicated issue may be performed. If the number of interceding instructions is greater than or equal to the threshold number of instructions for efficient dual issue, then dual issue may be performed.

As an example, if the processor core 114 can process 34 instructions simultaneously, then during dual issue, 17 instructions from each branch path may be issued and/or executed (or partially executed). Because only one of the dual paths is typically taken by the branch instruction, 17 instructions from the path which is not-taken may be invalidated and discarded. Accordingly, in determining whether to use predicated issue for short, conditional branches, a determination may be made of whether 17 instructions may be discarded during predicated issue. For example, if the number of interceding instructions between the short conditional branch and the target of the short conditional branch is less than 17, then predicated issue may be utilized because less than 17 instructions (the cost of dual issue) will be discarded if the short, conditional branch is taken and skips the interceding instructions.

In some cases, any threshold number of interceding instructions may be chosen for determining whether to perform predicated issue (e.g., a threshold which is greater than, equal to, or less than the cost of dual issue). If the number of interceding instructions is less than the threshold number, then predicated issue of the short, conditional branch may be utilized. If the number of interceding instructions is greater than or equal to the threshold, then another form of issue (e.g., dual issue or issue which utilizes prediction information) may be utilized.

In some cases, further restrictions may be placed on the interceding instructions when determining whether or not to perform predicated issue. For example, in one embodiment of the invention, to perform predicated issue, a requirement may be made that the target instruction for the branch instruction be independent from the interceding instructions such that invalidating the interceding instructions does not adversely affect the target instruction (e.g., by forwarding incorrect data from an invalidated interceding instruction to the target instruction). Optionally, in some cases, one or more instructions after the target instruction may be required to also be independent of the interceding instructions so that improper forwarding does not occur before the outcome of the conditional branch instruction is resolved and the interceding instructions are either validated or invalidated.

In some cases, where conflicts between the interceding instructions and subsequently executed instructions preclude predicated issue for a short, conditional branch instruction, dual path issue (e.g., with SMT capabilities) may be utilized for the short, conditional branch.

Dual Instruction Queue for Issuing Instructions

In one embodiment, execution of multiple paths of a branch instruction (e.g., the predicted path and the non-predicted path) may be delayed, thereby allowing the outcome of the branch instruction to be determined before execution of the followed path of the branch instruction. In some cases, by delaying execution of both paths of the branch instruction without actually executing instructions from either path, the followed path of the branch instruction may be subsequently executed without unnecessarily executing instructions from a path of the branch instruction which is not followed.

In one embodiment of the invention, the processor core 114 may utilize a dual instruction queue to delay execution of instructions for both a predicted and non-predicted path of a conditional branch instruction. For example, issue groups may be formed for both paths of the conditional branch instruction. Issue groups for a first one of the paths may be issued to a first queue of the dual instruction queue. Issue groups for a second one of the paths may be issued to a second queue of the dual instruction queue. After the outcome of the conditional branch instruction is determined, instructions from the branch path corresponding to the determined outcome (predicted or non-predicted) may be retrieved from the dual instruction queue and executed in an execution unit of the delayed execution pipeline.

Figure 18:
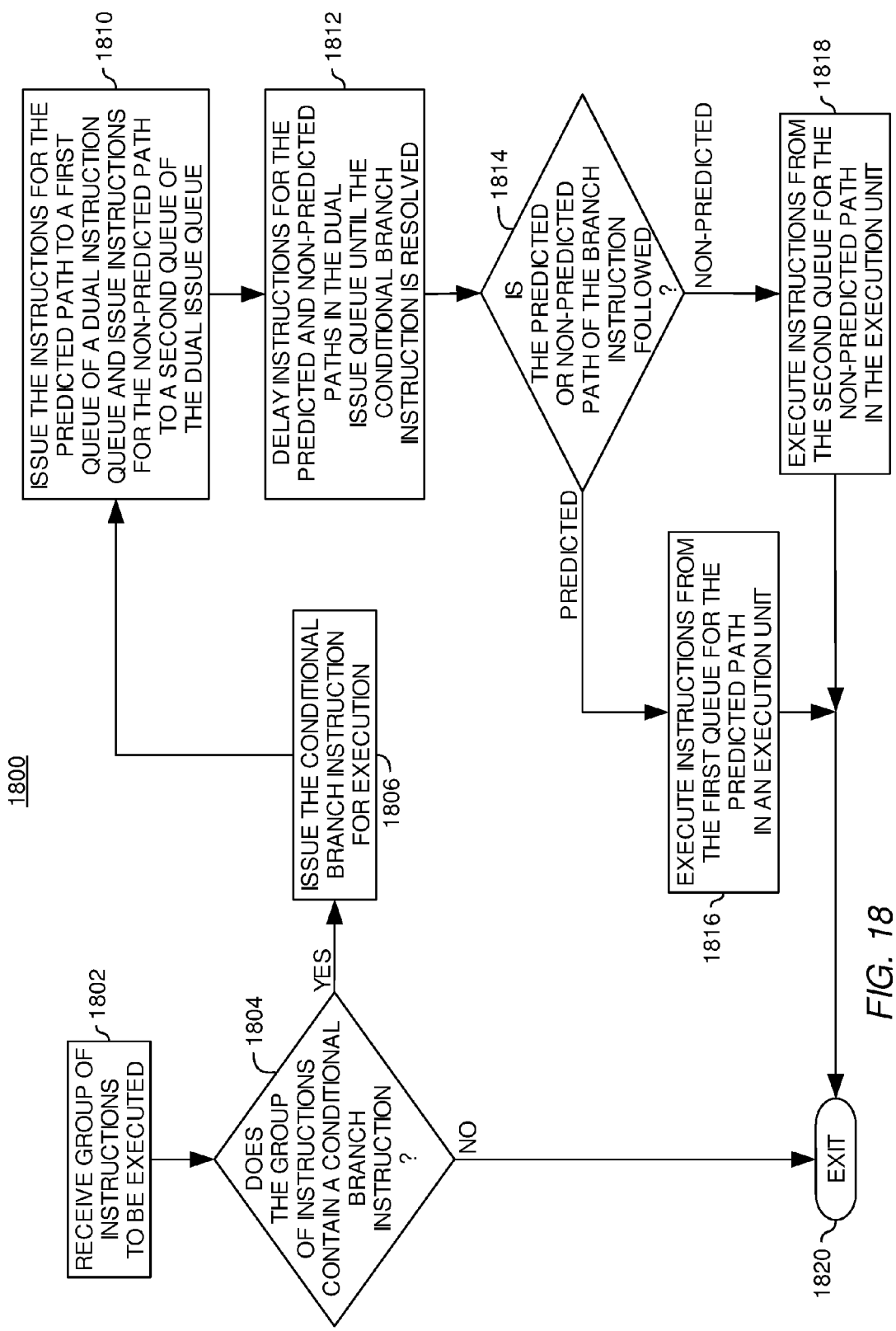
FIG. 18 is a flow diagram depicting a process for executing a branch instruction using a dual instruction queue according to one embodiment of the invention.

FIG. 18 is a flow diagram depicting a process 1800 for executing a branch instruction using a dual instruction queue according to one embodiment of the invention. The process 1800 may begin at step 1802 where a group of instructions to be executed is received. At step 1804, a determination may be made of whether the group of instructions contains a conditional branch instruction. If the group of instructions contains a conditional branch instruction, the conditional branch instruction may be issued for execution at step 1806.

At step 1810, the instructions for the predicted path of the conditional branch instruction may be issued to a first queue of the dual instruction queue and instructions for the non-predicted path of the conditional branch instruction may be issued to a second queue of the dual issue queue. At step 1812, the instructions for the predicted and non-predicted paths of the conditional branch instruction may be delayed in the dual issue queue until the outcome of the conditional branch instruction is determined at step 1814. If the predicted path of the branch instruction is followed, then the instructions from the first queue (instructions for the predicted path) of the dual instruction queue may be executed in an execution unit at step 1816. If the non-predicted path of the branch instruction is followed, then the instructions from the second queue (instructions for the non-predicted path) of the dual instruction queue may be executed in the execution unit at step 1818. The process 1800 may finish at step 1820.

Figure 19:
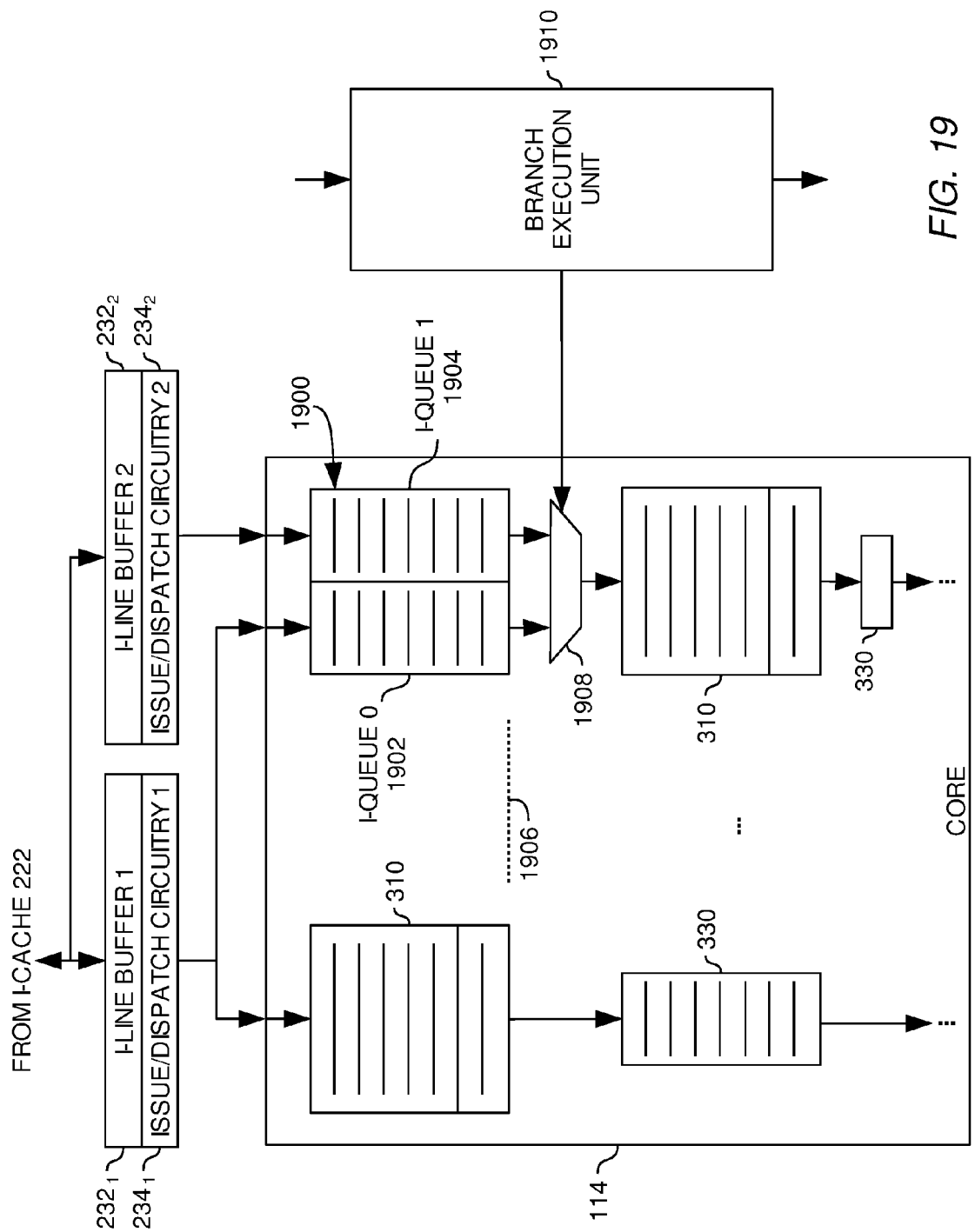
FIG. 19 is a block diagram depicting a processor core with a dual instruction queue according to one embodiment of the invention.

FIG. 19 is a block diagram depicting a processor core 114 with a dual instruction queue 1900 according to one embodiment of the invention. As depicted, the dual instruction queue 1900 may include a first I-queue 1902 and a second I-queue 1904. A first I-line buffer $232_1$ and a second I-line buffer $232_2$ may be used to buffer instructions fetched from the I-cache 222 for the predicted and non-predicted paths of a conditional branch instruction, respectively (or vice-versa). Issue and dispatch circuitry $234_1$, $234_2$, may also be provided to issue instructions for each path of the conditional branch instruction.

In one embodiment, the conditional branch instruction may be executed in branch execution unit 1910. While the outcome of the conditional branch instruction is being determined, instructions for the predicted path and non-predicted path of the conditional branch instruction may be buffered in I-line buffers $232_1$, $232_2$, issue by issue/dispatch circuitry $234_1$, $234_2$, and delayed in the I-queues 1902, 1904 of the dual instruction queue 1900, respectively. In one embodiment of the invention, the depth 1906 of the dual I-queue 1900 may be sufficient to allow both paths of the conditional branch instruction to be buffered without stalling execution of instructions in the core 114 while the outcome of the conditional branch instruction is determined using the branch execution unit 1910.

After the branch execution unit 1910 is used to determine the outcome of the conditional branch instruction (e.g., taken or not-taken), the outcome may be provided to selection circuitry 1908. The selection circuitry 1908 may then provide instructions for the followed path of the conditional branch instruction from the corresponding I-queue 1902, 1904. For example, if the instructions for the predicted path are delayed in I-queue 0 1902 and the instructions for the non-predicted path are delayed in I-queue 1 1904, and if the conditional branch instruction follows the non-predicted path, then the selection circuitry 1908 may select instructions from I-queue 1 1904 to be executed by the execution unit 310. Optionally, if the outcome of the conditional branch instruction indicates that the branch instruction follows the predicted path, then the selection circuitry 1908 may select instructions from I-queue 0 1902 to be executed by the execution unit 310.

While depicted in FIG. 19 with respect to a single dual I-queue 1900 for a pipeline, embodiments of the invention may provide a dual I-queue for each pipeline which utilizes delayed execution (e.g., pipelines P1, P2, P3 in FIG. 3).

In some cases, selection circuitry may utilize validity bits stored in the dual instruction queue 1900 (e.g., instead of a signal from the branch execution unit 1910) to determine which instructions to issue to the execution unit 310. As an example, the branch execution unit 1910 may indicate that one of the paths is valid and that the other path is invalid, e.g., using path identifiers for each path which are stored in the dual instruction queue 1900. Optionally, validity bits may be provided for each instruction in each path. The validity bits may be set or cleared based on the outcome of the conditional branch instruction).

For example, the path in the I-queue 0 1902 may be Path 0 and the path in the I-queue 1 1904 may be Path 1. Each instruction in each path may have a validity bit which may be set to 1 or cleared to 0. After the branch execution unit 1910 determines which path of the branch instruction is followed, the validity bits for the followed path may be set to 1, indicating that the instructions for that path should be executed in the execution unit 310. The validity bits for the path which is not followed may be set to 0, indicating that the instructions for that path should not be executed. Thus, when the instructions are received by the selection circuitry 1908, the selection circuitry 1908 may use the validity bits (e.g., instead of a signal from the branch execution unit 1910) to determine which instructions to provide to the execution unit 310. For example, the selection circuitry 1908 may only provide instructions with a set validity bit to the execution unit 310 for execution.

In one embodiment, the dual instruction queue 1900 may be utilized in a processor core 114 which does not utilize simultaneous multithreading. Thus, in some cases, merge circuitry may not be provided for the two groups of issue circuitry 234$_1$, 234$_2$ (e.g., because the predicted and non-predicted paths may not executed simultaneously and thus, separate issue groups may be created and issued without requiring any merging).

Optionally, in one embodiment of the invention, the dual instruction queue 1900 may be utilized in a processor core 114 which does utilize simultaneous multithreading. For example, the dual instruction queue 1900 may be utilized with merge circuitry to issue both predicted and non-predicted paths for a conditional branch instruction in a first thread and also for instructions in a second thread. Also, embodiments of the invention may provide a triple-width instruction queue which holds instructions for a predicted path and a non-predicted path of a first thread as well as instructions from a second thread. Depending upon the priority of the threads and/or depending on the number of threads being executed, the selection circuitry may be used to select from any one of the delay queue paths in the triple-width instruction queue. For example, valid instructions from a higher priority thread may be executed from the triple-width instruction queue. Optionally, valid instructions from a thread which is not quiesced may be issued from the triple width-instruction queue.

In one embodiment of the invention, the dual instruction queue 1900 may be used to hold a predicted and non-predicted path only where a conditional branch instruction is unpredictable or only partially predictable. Where a conditional branch instruction is predictable, the predicted path may be held in one path of the dual instruction queue 1900 while other instructions, e.g., from another thread, may be held in the other path of the dual instruction queue 1900 and issued, for example, if the other thread is quiesced.

In some cases, as described above, multiple dual instruction queues 1900 may be used in multiple delayed execution pipelines (e.g., P1, P2, etc . . . ). Optionally, the dual instruction queue may be used in a single execution pipeline such as, for example, the most-delayed execution pipeline. In one embodiment, where multiple dual instruction queues 1900 are utilized, a determination may be made of which dual instruction queue 1900 should be utilized in executing the conditional branch instruction. For example, if the conditional branch instruction contains a long dependency such that the outcome of the conditional branch instruction cannot be determined for an extended number of processor cycles, then the most-delayed dual instruction queue may be utilized to delay instructions for the conditional branch instruction paths.

Execution of Branch Instructions According to Predictability

In some cases, each of the methods and the circuitry described above may be used for executing conditional branch instructions. Optionally, in one embodiment of the invention, a level of predictability for a conditional branch instruction may be calculated. Based on the calculated level of predictability of the conditional branch instruction, one of a plurality of methods may be used to execute the conditional branch instruction. For example, a determination may be made of whether a conditional branch instruction is fully predictable, partially predictable, or unpredictable. Based on the level of predictability, a method of execution for the conditional branch instruction may be chosen. By choosing a method of executing a conditional branch instruction according to its predictability, overall resource usage of the processor 110 may be maximized while minimizing processor 110 inefficiency.

Figure 17A:
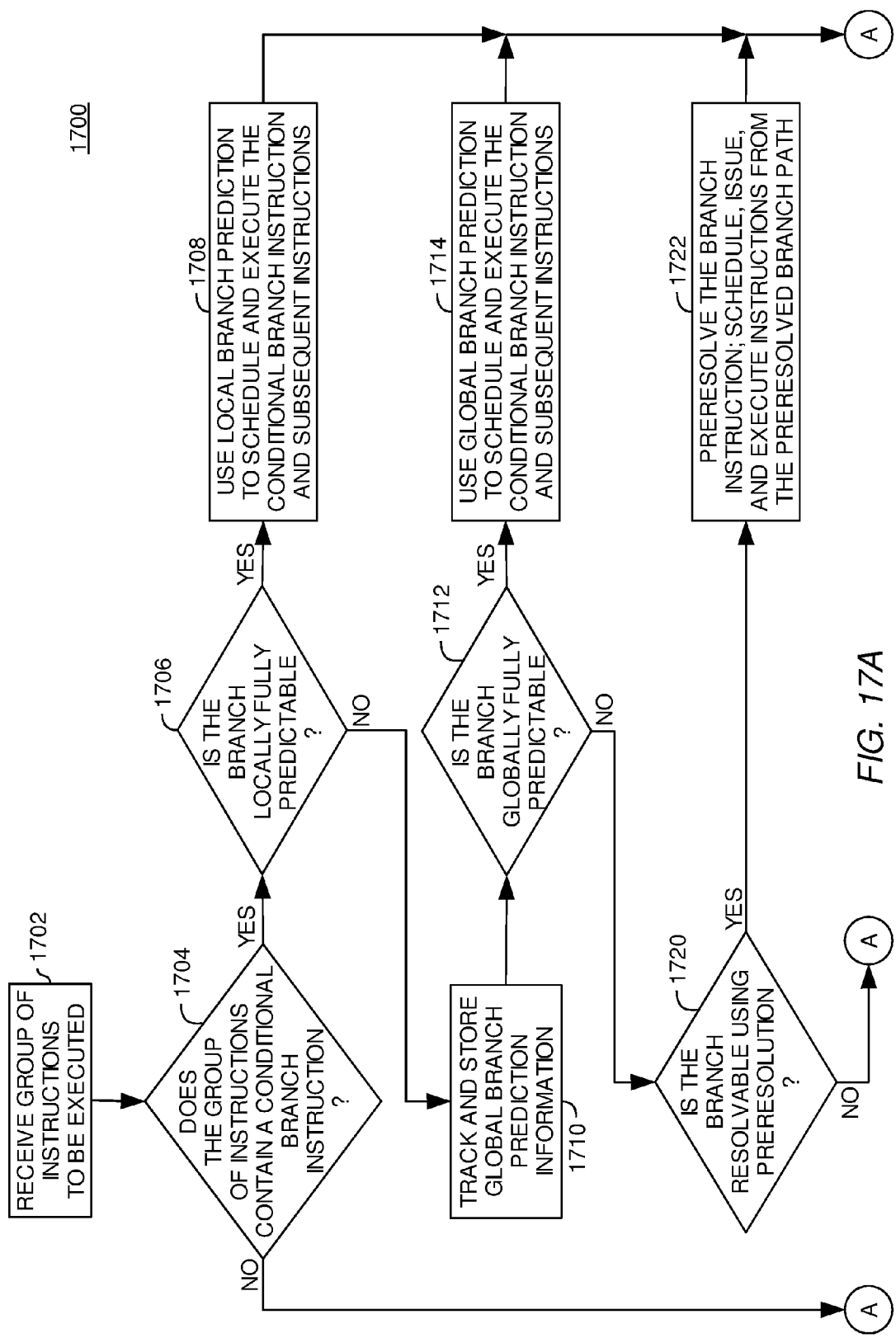
FIGS. 17A-B depict a process for executing a conditional branch instruction depending on the predictability of the conditional branch instruction according to one embodiment of the invention.
Figure 17B:
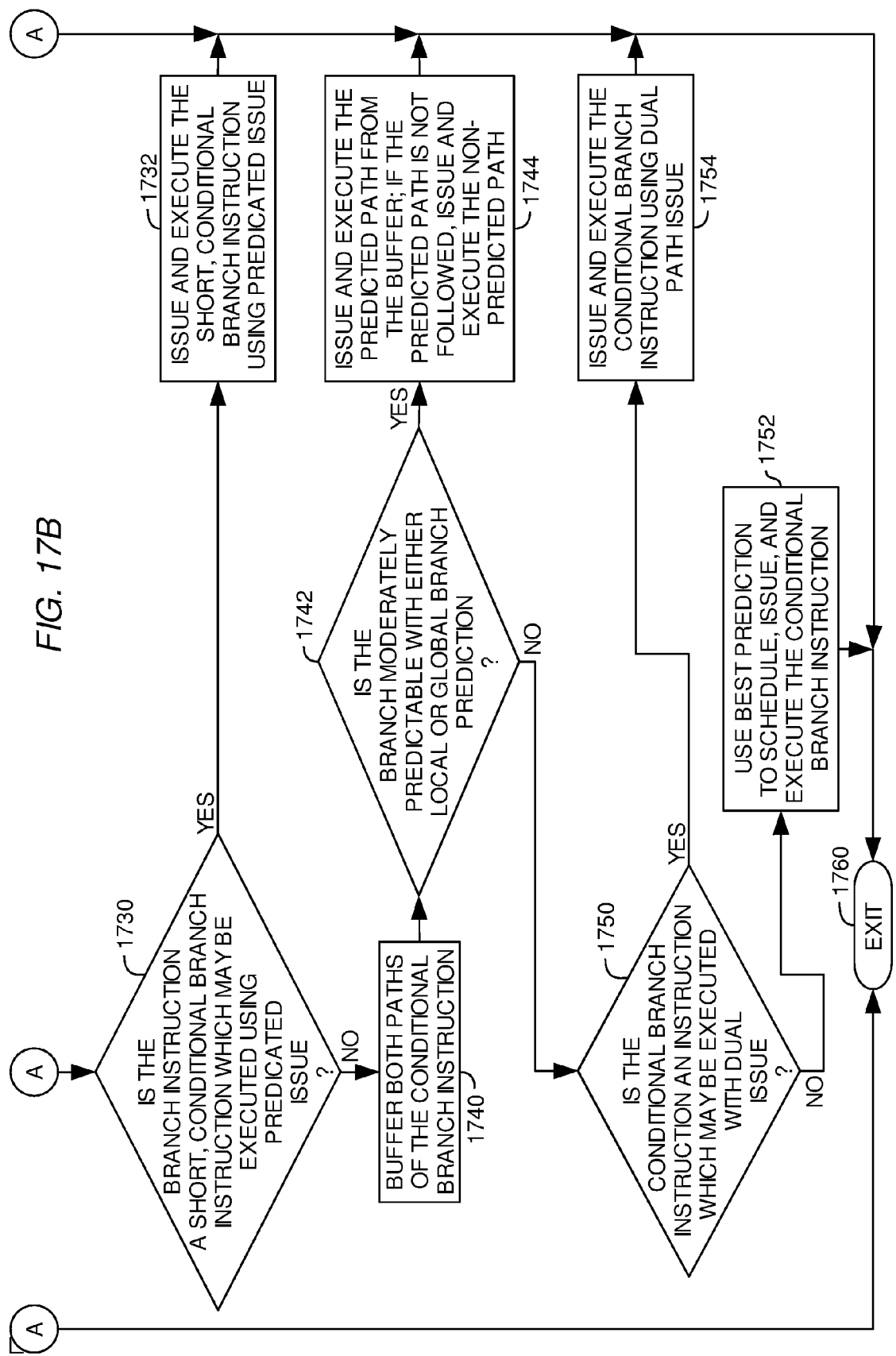

FIGS. 17A-B depict a process 1700 for executing a conditional branch instruction depending on the predictability of the conditional branch instruction according to one embodiment of the invention. The process 1700 may begin at step 1702 (FIG. 17A) where a group of instructions to be executed is received. At step 1704, a determination may be made of whether the group of instructions contains a conditional branch instruction. If the group of instructions contains a conditional branch instruction, a determination may be made at step 1706 of whether the branch is locally fully predictable. For example, such a determination may be made by determining if the local branch history counter CNT is greater than or equal to a threshold value for local branch predictability. If the branch is locally fully predictable, then at step 1408 local branch prediction may be used to schedule and execute the conditional branch instruction and subsequent instructions.

At step 1710, if the branch is not locally fully predictable, the global branch prediction information may be tracked and stored. Then, at step 1712, a determination may be made of whether the branch instruction is globally fully predictable.

Such a determination may be made, for example, by determining if the global branch history counter GBCNT is greater than or equal to a threshold value for global branch predictability. If the branch is globally fully predictable, then at step 1714 global branch prediction may be used to schedule and execute the conditional branch instruction and subsequent instructions. By using branch prediction where a conditional branch instruction is locally or globally fully predictable, the processor 110 may, in some cases, avoid using the resources necessary to perform preresolution, predicated issue, or dual path issue of the conditional branch instruction.

If a determination is made that the branch is neither locally nor globally fully predictable, then at step 1720 a determination may be made of whether the conditional branch instruction is preresolvable. If the conditional branch instruction is preresolvable, then at step 1722 the conditional branch instruction may be preresolved and the conditional branch instruction and subsequent instruction may be scheduled, issued, and executed based on the preresolved path (e.g., taken or not-taken) of the conditional branch instruction. In one embodiment, by using preresolution, the processor 110 may avoid utilizing predicated issue or dual path issue of the conditional branch instruction, which may, in some cases, result in the results of executed instructions being discarded and thereby decreasing processor efficiency.

If the conditional branch instruction is not preresolvable, then at step 1730 (FIG. 174B) a determination may be made of whether the conditional branch instruction is a short, conditional branch instruction which may be executed using predicated issue. Such a determination may include determining whether instruction dependencies preclude predicated issue and/or determining whether dual issue would be more efficient than predicated issue. If a determination is made that the conditional branch instruction is a short, conditional branch instruction which may be executed using predicated issue, than at step 1732 the short, conditional branch instruction may be issued and executed using predicated issue as described above.

If a determination is made that predicated issue cannot be used, then at step 1740 both paths of the conditional branch instruction may be buffered. By buffering both paths of the conditional branch instruction, a quicker recovery may be made later if the processor 110 later mispredicts the outcome of the conditional branch instruction (e.g., if the outcome of the branch instruction is mispredicted, the other path of the branch instruction may be readily available for execution). Also, by buffering both paths of the conditional branch instruction, dual may issue may be performed if appropriate.

At step 1742, a determination may be made of whether the conditional branch instruction is moderately predictable. Such a determination may include determining whether the local branch history counter CNT is above a threshold for moderate local predictability and/or determining whether the global branch history counter GBCNT is above a threshold for moderate global predictability. If a determination is made that the conditional branch instruction is moderately predictable, then the predicted path for the branch instruction may be issued and executed from the I-buffer 232 at step 1744. As described above, if a determination is later made that the predicted path was not followed by the conditional branch instruction, then a quick recovery may be made by issuing and executing the non-predicted, buffered path of the branch instruction. By buffering, but not executing the non-predicted path of the branch instruction, the processor 110 may quickly recover and issue the non-predicted path of the branch instruction if the outcome of the instruction indicates that the prediction is incorrect and that the non-predicted path of the instruction is followed.

If a determination is made that the conditional branch instruction is neither locally nor globally moderately predictable (e.g., the branch is unpredictable), then at step 1750, a determination may be made of whether the conditional branch instruction may be executed with dual path execution. Such a determination may include, for example, determining whether another thread in the processor 110 is stalled (thereby allowing both paths to be issued in separate threads), determining the branch distance for the conditional branch instruction, determining instruction dependencies for each of the branch paths, and/or any of the other considerations described above with respect to dual path execution.

If a determination is made that the conditional branch instruction may be executed using dual path issue, then at step 1754 the conditional branch instruction may be issued and executed using dual path issue, e.g., as described above. If, however, a determination is made that the conditional branch instruction may not be executed using dual path issue, then the best prediction for the conditional branch instruction may be used to schedule, issue, and execute the branch instruction and subsequent instructions. The best prediction may include, for example, using either local or global prediction based on which type of prediction is more reliable (e.g., if GBCNT is greater than or equal to CNT, then global prediction may be used instead of local prediction to execute the branch instruction). The process 1700 may then finish at step 1760.

Maintaining and Updating Branch Prediction Information

In one embodiment of the invention, branch prediction information and/or other information may be continuously tracked and updated while instructions are being executed such that the branch prediction information and other stored values may change over time as a given set of instructions is executed. Thus, the branch prediction information may be dynamically modified, for example, as a program is executed.

In one embodiment of the invention, branch prediction information and/or other information may be stored during an initial execution phase of a set of instructions (e.g., during an initial "training" period in which a program is executed). The initial execution phase may also be referred to as an initialization phase or a training phase. During the training phase, branch prediction information may be tracked and stored (e.g., in the I-line containing the instruction or in a shadow cache), for example, according to the criteria described above.

In one embodiment, one or more bits (stored, for example, in the I-line containing the branch instruction or in the global branch history table) may be used to indicate whether an instruction is being executed in a training phase or whether the processor 110 is in a training phase mode. For example, a mode bit in the processor 110 may be cleared during the training phase. While the bit is cleared, the branch prediction information may be tracked and updated as described above. When the training phase is completed, the bit may be set. When the bit is set, the branch prediction information may no longer be updated and the training phase may be complete.

In one embodiment, the training phase may continue for a specified period of time (e.g., until a number of clock cycles has elapsed, or until a given instruction has been executed a number of times). In one embodiment, the most recently stored branch prediction information may remain stored when the specified period of time elapses and the training phase is exited. Also, in one embodiment, the training phase may continue until a given I-line has been executed a threshold number of times. For example, when the I-line is fetched from a given level of cache (e.g., from main memory 102, the L3 cache, or the L2 cache 112), a counter (e.g., a two or three bit counter) in the I-line may be reset to zero. While the counter is below a threshold number of I-line executions, the training phase may continue for instructions in the I-line. After each execution of the I-line, the counter may be incremented. After the threshold number of executions of the I-line, the training phase for instructions in the I-line may cease. Also, in some cases, different thresholds may be used depending upon the instructions in the I-line which are being executed (e.g., more training may be used for instructions which have outcomes varying to a greater degree).

In another embodiment of the invention, the training phase may continue until one or more exit criteria are satisfied. For example, the initial execution phase may continue until a branch instruction becomes predictable. When the outcome of a branch instruction becomes predictable, a lock bit may be set in the I-line indicating that the initial training phase is complete and that the branch history bit for the strongly predictable branch instruction may be used for subsequent execution of the branch instruction.

In another embodiment of the invention, the branch prediction information may be modified in intermittent training phases. For example, a frequency and duration value for each training phase may be stored. Each time a number of clock cycles corresponding to the frequency has elapsed, a training phase may be initiated and may continue for the specified duration value. In another embodiment, each time a number of clock cycles corresponding to the frequency has elapsed, the training phase may be initiated and continue until specified threshold conditions are satisfied (for example, until a specified level of predictability for an instruction is reached, as described above).

While described above in some cases with respect to execution of instructions in a cascaded, delayed execution pipeline unit, embodiments of the invention may be used generally with any processor, including processors which do not utilize delayed execution pipelines.

While the foregoing is directed to embodiments of the present invention, other and further embodiments of the invention may be devised without departing from the basic scope thereof, and the scope thereof is determined by the claims that follow.

What is claimed is:

1. A method of executing instructions, comprising:
receiving a branch instruction along with one or more additional instructions scheduled to issue before the branch instruction in a cascaded delayed execution pipeline comprising at least a first pipeline and a second pipeline, wherein beginning of execution of instructions in the second pipeline is delayed with respect to beginning of execution instructions in the first pipeline, wherein a first path of the branch instruction branches to a target instruction, and wherein a second path of the branch instruction branches to one or more interceding instructions between the branch instruction and the target instruction;
determining if the branch instruction is preresolvable, wherein the branch instruction is preresolvable when one or more instructions preceding the branch instruction do not modify an outcome of the branch instruction;
upon determining that the branch instruction is preresolvable:
issuing the branch instruction before issuing the one or more additional instructions to preresolve the branch instruction, wherein the branch instruction is issued to any one of the first pipeline and the second pipeline of the cascaded delayed execution pipeline, and
scheduling execution of subsequent instructions based on an outcome of the preresolved branch instruction;
upon determining that the branch instruction is not preresolvable:
issuing the one or more interceding instructions and the target instruction,
determining if the branch instruction follows the first path or the second path, and
upon determining that the branch instruction follows the first path, invalidating the one or more interceding instructions between the branch instruction and the target instruction.

2. The method of claim 1, wherein the one or more interceding instructions and the target instruction are executed before the one or more interceding instructions are invalidated.

3. The method of claim 2, wherein invalidating the one or more interceding instructions causes results of the one or more interceding instructions to be discarded.

4. The method of claim 1, wherein the one or more interceding instructions are issued only if a number of instructions between the branch instruction and the target instruction is below a threshold number.

5. The method of claim 1, wherein the branch instruction, the one or more interceding instructions, and the target instruction are executed in a single thread of execution.

6. The method of claim 1, wherein an outcome of the target instruction and outcomes of one or more instructions succeeding the target instruction are independent from an outcome of the one or more interceding instructions.

7. The method of claim 1, wherein the one or more interceding instructions are issued if either:
a predictability value for the branch instruction is below a threshold value for predictability; or
a predicted outcome of the branch instruction indicates that the second path will be followed by the branch instruction.

8. The method of claim 1, further comprising:
prior to determining if the branch instruction is preresolvable, determining if a branch corresponding to the branch instruction is locally fully predictable;
upon determining that the branch instruction is not locally fully predictable:
tracking global branch prediction information,
storing the global branch prediction information, and
determining if the branch corresponding to the branch instruction is globally fully predictable; and
determining if the branch instruction is preresolvable only upon determining that the branch instruction is not globally fully predictable.

* * * * *